United States Patent
Hoyos

(10) Patent No.: US 11,038,878 B2
(45) Date of Patent: Jun. 15, 2021

(54) COMPUTER SYSTEM SECURITY USING A BIOMETRIC AUTHENTICATION GATEWAY FOR USER SERVICE ACCESS WITH A DIVIDED AND DISTRIBUTED PRIVATE ENCRYPTION KEY

(71) Applicant: Hector Hoyos, Ridgefield, CT (US)

(72) Inventor: Hector Hoyos, Ridgefield, CT (US)

( * ) Notice: Subject to any disclaimer, the term of this patent is extended or adjusted under 35 U.S.C. 154(b) by 212 days.

(21) Appl. No.: 16/355,824

(22) Filed: Mar. 17, 2019

(65) Prior Publication Data
US 2020/0296093 A1  Sep. 17, 2020

Related U.S. Application Data

(60) Provisional application No. 62/818,629, filed on Mar. 14, 2019.

(51) Int. Cl.
| | |
|---|---|
| *H04L 29/06* | (2006.01) |
| *H04L 9/06* | (2006.01) |
| *H04L 9/32* | (2006.01) |
| *H04L 9/00* | (2006.01) |

(52) U.S. Cl.
CPC .......... *H04L 63/0861* (2013.01); *H04L 9/006* (2013.01); *H04L 9/0643* (2013.01); *H04L 2209/38* (2013.01); *H04L 2209/56* (2013.01)

(58) Field of Classification Search
CPC ... H04L 63/0861; H04L 9/0643; H04L 9/006; H04L 2209/38; H04L 2209/56; H04L 63/0442; H04L 9/3247; H04L 9/3263; H04L 9/3231
See application file for complete search history.

(56) References Cited

U.S. PATENT DOCUMENTS

| | | | | |
|---|---|---|---|---|
| 6,185,316 B1 * | 2/2001 | Buffam | ............. | G07C 9/257 382/115 |
| 8,490,164 B2 * | 7/2013 | Takahashi | ............. | G06F 21/31 726/6 |
| 10,289,835 B1 * | 5/2019 | Machani | ............. | H04L 63/0428 |
| 10,516,527 B1 * | 12/2019 | Machani | ............. | H04L 9/0894 |
| 10,735,193 B1 * | 8/2020 | Knas | ............. | H04L 9/0861 |

(Continued)

*Primary Examiner* — Darren B Schwartz
(74) *Attorney, Agent, or Firm* — Patents on Demand P.A.; Brian K. Buchheit

(57) ABSTRACT

A secure computer system architecture can be comprised of network-enabled end-user devices, services available to the end-user devices, and a biometric authentication gateway. Each service can be provided via one or more appropriately-configured servers meeting a predefined minimum level of computer and network security and/or a blockchain network. The biometric authentication gateway can control access to the services based upon validation of a user's biometric vector against a pre-established biometric vector. The architecture can utilize an improved public key infrastructure (PKI) approach that segments a private encryption key into three parts and distributes the three parts between the end-user device and the biometric authentication gateway. Two of the three parts can be encased within fuzzy vaults based upon the user's biometric vector. Retrieving the key parts from the fuzzy vaults cannot be performed without successful biometric authentication of the user, ensuring that only the user can execute the services.

20 Claims, 25 Drawing Sheets

(56) References Cited

U.S. PATENT DOCUMENTS

| | | | |
|---|---|---|---|
| 2003/0088782 A1* | 5/2003 | Forrest | H04L 9/3231 713/186 |
| 2004/0125993 A1* | 7/2004 | Zhao | G06K 9/00006 382/124 |
| 2004/0139329 A1* | 7/2004 | Abdallah | H04L 9/0894 713/182 |
| 2005/0129290 A1* | 6/2005 | Lo | G06K 9/036 382/124 |
| 2005/0273333 A1* | 12/2005 | Morin | G10L 17/22 704/247 |
| 2006/0045350 A1* | 3/2006 | Itoh | G06K 9/00087 382/209 |
| 2009/0208019 A1* | 8/2009 | Celik | H04L 9/085 380/277 |
| 2009/0210722 A1* | 8/2009 | Russo | H04L 9/0866 713/189 |
| 2010/0138668 A1* | 6/2010 | Tsuria | H04H 60/23 713/186 |
| 2013/0046973 A1* | 2/2013 | Resch | H04L 9/0877 713/156 |
| 2013/0326229 A1* | 12/2013 | Eguchi | G06F 21/32 713/186 |
| 2014/0105399 A1* | 4/2014 | Lin | H04W 12/08 380/270 |
| 2014/0325230 A1* | 10/2014 | Sy | H04L 63/0861 713/171 |
| 2015/0095654 A1* | 4/2015 | Li | H04L 9/0866 713/186 |
| 2016/0149904 A1* | 5/2016 | Kim | G06K 9/0061 713/186 |
| 2016/0173455 A1* | 6/2016 | Ramachandra Rao | H04L 63/0428 713/168 |
| 2019/0109711 A1* | 4/2019 | Gladwin | H04L 9/085 |
| 2019/0311100 A1* | 10/2019 | Lindell | G06K 9/00006 |
| 2019/0311148 A1* | 10/2019 | Andrade | H04L 63/102 |
| 2019/0378142 A1* | 12/2019 | Darnell | G06F 21/645 |
| 2020/0007337 A1* | 1/2020 | Gehrmann | H04L 9/0662 |

* cited by examiner

COMPUTER SYSTEM SECURITY USING A BIOMETRIC AUTHENTICATION GATEWAY FOR USER SERVICE ACCESS WITH A DIVIDED AND DISTRIBUTED PRIVATE ENCRYPTION KEY

BACKGROUND

The present invention relates to the field of computer system security, and more particularly to an improving computer system security using a biometric authentication gateway for user service access with a divided and distributed private encryption key.

Security is a key concern for most computer systems that must be balanced against other driving business factors like customer service response time and cost. As the complexity of the computer system increases, so does its security issues. Every piece of hardware and software has the potential to expose the computer system to vulnerabilities. A vulnerability in physical security, transmission security, data security, functional security, or digital security is exploitable by malicious entities.

In addition to the elements of the computer system that a business or organization directly controls, the system must be able to defend itself from attack from external devices that connect to it. End-user devices are often the target of malicious attacks to access sensitive information (e.g., user-names, passwords, encryption keys, etc.) that will provide access to financial or other valuable data (e.g., bank funds, investment portfolios, etc.). Since it is well-known that the major commercial operating systems (OSes) were designed for consumers with the goal of maximizing convenience and usability and not security, there will be a continued need for computer systems to fend off attacks from their users' devices.

Various approaches to these security issues have been developed over the years. Typically, such an approach focuses on only one aspect of the computer system's security needs like physical or data security, improving only that aspect of the system's function, such as the use of biometrics for physical security or public key infrastructure (PKI) for data encryption. While biometric security is considered to provide the highest level of security, its application is often limited to physical access control of a location or device and not to software or communications.

PKI is still used for communication encryption/decryption. While considered relatively secure, a fundamental flaw remains—keeping the user's private encryption key secure. That is, if the security of a user's private encryption key is compromised (i.e., accessed by malware), any entity having the private key is then able to impersonate the user. Most electronic security protocols like PKI do not verify that the person using the private key is the actual user.

Therefore, what is needed is an approach that incorporates biometric security access control for the computer system's services and the user's private encryption key. Such a solution would have an authentication gateway that requires biometric verification of the user's identity to access provided services. The user's private encryption key would be divided into three pieces with the pieces stored on a separate system components.

BRIEF SUMMARY

One aspect of the present invention can include a secure computer system architecture that is comprised of network-enabled end-user devices, services available to the end-user devices, and a biometric authentication gateway. Each service can be provided via one or more appropriately-configured servers meeting a predefined minimum level of computer and network security and/or a blockchain network. The blockchain network can support the use of non-native applications, digital contracts, and non-native tokens. The services can be accessed via a corresponding software application running on each end-user device. The biometric authentication gateway can control access to the services by end-user devices based upon validation of a user's biometric vector. Enrollment with the biometric authentication gateway by each end-user device and their respective user can be required. This enrollment can establish an enrollment biometric vector for the user and a relationship with an identifier of the respective end-user device. Network communications between the end-user devices, servers and/or the computing system providing the services, and the biometric authentication gateway can be secured using an improved public key infrastructure (PKI) approach that segments a private encryption key generated for the user into three parts and distributes the three parts between the respective end-user device and the biometric authentication gateway. Two of the three parts can be encased within fuzzy vaults based upon the user's respective biometric vector. Retrieving the two parts of the user's respective private encryption key from the fuzzy vaults for reassembly cannot be performed without successful biometric authentication of the user to their respective enrollment biometric vector, ensuring that only the user is able to execute the services.

Another aspect of the present invention can include a method for securing a private encryption key that begins with the generation of a private encryption key for use by a computer system to exchange communications secured via public key infrastructure (PKI). The computer system can be configured in accordance with a secure system architecture that utilizes a biometric authentication gateway to control access to its components and/or services. Users of the computer system can be required to enroll with the biometric authentication gateway in order to establish a respective enrollment biometric vector and an identity of a respective end-user device. The generated private encryption key can be segmented into three parts of predefined lengths. A first part and a second part of the segmented private encryption key can be encrypted using a predetermined cryptography technique that incorporates unique elements from the respective user's enrollment biometric vector. Subsequent access to the first and second parts can require successful biometric authentication by the respective user. The three parts of the private encryption key can then be stored between the biometric authentication gateway and the end-user device. The private encryption key can remain uncompromised if one or two of the three parts becomes compromised.

Yet another aspect of the present invention can include a computer system security method that starts with the enrollment of a user and a respective end-user device with a biometric authentication gateway of a secure computer system. This enrollment can produce an enrollment biometric vector for the user and a unique device ID for the end-user device. A biometric vector can be a unique subset of data points extracted from one or more items of the user's biometric data as captured by the end-user device. The biometric vector can be encrypted using a predetermined cryptography technique that utilizes the biometric vector and can be stored local to the end-user device. A public key infrastructure (PKI) private encryption key belonging to the user can be secured by segmenting the private encryption key into three parts and distributing the three parts between the end-user device and one or more component of the secure computer system. At least two of the three parts can be encrypted using the predetermined cryptography technique that utilizes the user's enrollment biometric vector. The private encryption key can remain uncompromised if one or two of the three parts becomes compromised. In response to a request to access a service provided by the secure computer system or to execute a task that requires the user's secured private encryption key, a newly-captured biometric vector for the user can be authenticated against their respective enrollment biometric vector. Failure to perform this biometric authentication can result in an automatic denial of the request. Upon successful biometric authentication, as indicated by the biometric authentication gateway, the request can be handled. Upon unsuccessful biometric authentication, as indicated by the biometric authentication gateway, the request can be denied.

DETAILED DESCRIPTION

Figure 1:
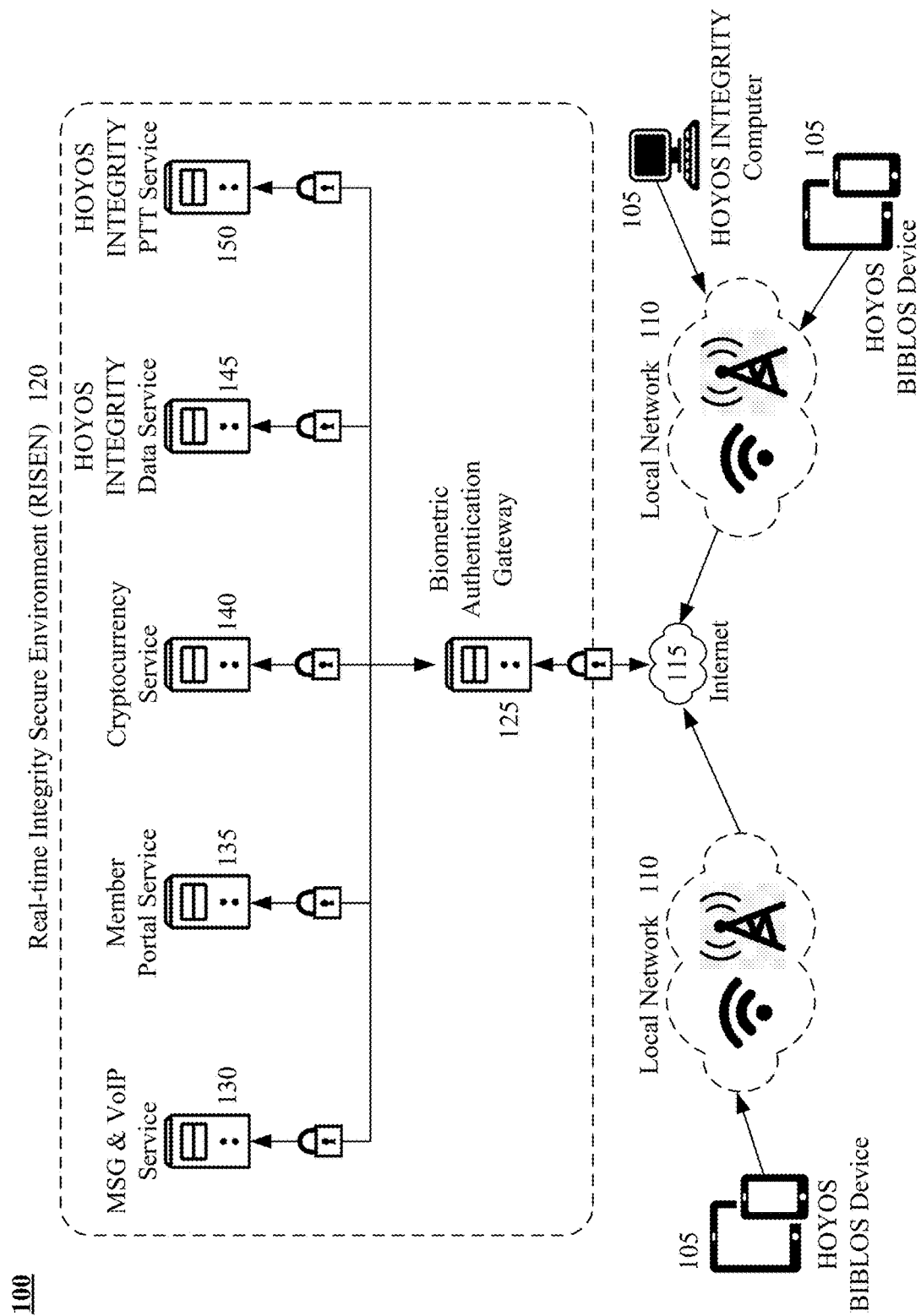
FIG. 1 is an illustration of a secure computer system architecture featuring a biometric authentication gateway in accordance with embodiments of the inventive arrangements disclosed herein.

Embodiments of the disclosed invention can present a solution for improving the security of a computer system architecture by using biometrics to control component/service access and using biometric in conjunction with an improved approach for securing a private encryption key.

Firstly, a biometric authentication gateway can be used as the control point for allowing/denying end-user devices access to the secure services provided by the Real-time Integrity Secure Environment (RISEN). Allowance or denial can be based upon biometric authentication of the user. Biometric authentication can require a biometric vector, captured in real-time by the end-user device, to be compared against an enrollment biometric vector, created when the user registers with the biometric authentication gateway.

The improved private encryption key security can split the key into three parts. Two of the three parts can be encrypted. The encryption technique can use the user's biometric vector as a basis, such as the fuzzy vault scheme. The two fuzzy vaults and one unencrypted part can then be stored by two or more components of the RISEN like the biometric authentication gateway and a blockchain network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an illustration 100 of a secure computer system architecture featuring a biometric authentication gateway 125 in accordance with embodiments of the inventive arrangements disclosed herein. In illustration 100, various end-user devices 105 can use a local network 110 to connect to the Internet 115 in order to access the Real-time Integrity Secure Environment or RISEN 120. The RISEN 120 can be an embodiment of the secure computer system architecture.

An end-user device 105 can represent a variety of computing devices configured to interact with the RISEN 120. For the highest level of security, the end-user devices 105 can be specially-configured HOYOS devices like an INTEGRITY computer or BIBLOS (Biometrics BLOckchain Secure) device (e.g., smart phone or tablet computer). These devices 105 can utilize the highly-secure INTEGRITY operating system that is based upon INTEGRITY-178B, which is used for military and commercial systems requiring the highest security. End-user devices 105 running operating systems other than INTEGRITY, such as ANDROID OS, can be utilized with a lesser degree of end-to-end system security due to the existing and potential vulnerabilities inherent to their respective operating system.

The local network 110 can represent the hardware and/or software elements that form the network nodes that link the end-user devices 105 to the Internet 115. As shown in illustration 100, the local network 110 can include cellular elements as well as wireless networking elements. Depending on the location of the end-user device 105 and available communication options, the local network 110 can be comprised of multiple networks and/or different types of networks. For example, the end-user device 105 can connect to cellular network that then connects to a fiber-optic network to reach the Internet 115; the local network 110 being the cellular and fiber-optic network.

The biometric authentication gateway 125 can be the hardware and/or software components necessary to control access to the secure services 130-150 running in the RISEN 120 based on users' biometric data. The biometric authentication gateway 125 can utilize the Biometric Open Protocol Standard (BOPS) that is maintained by the International Electrical and Electronics Engineers Association (IEEE), specifically IEEE2410.

Users can register with the biometric authentication gateway 125 in a process called Genesis. During Genesis, the user can use a default SSL certificate with an application on their end-user device 105 to register. In return, the end-user device 105 can receive a unique client certificate for subsequent 2-way SSL communications from the biometric authentication gateway 125. The biometric authentication gateway 125 can manage multiple services where each service utilizes a unique client certificate per user. For additional security, the biometric authentication gateway 125 can run in the Trusted Execution Environment (TEE) of Software Guard eXtensions (SGX) processors, protecting the memory of each process.

The biometric authentication gateway 125 can require the user to successfully authenticate their biometric vector via their end-user device 105 in order to access any of the secure services 130-150 in the RISEN 120, ensuring that only the registered user is allowed access. As shown in illustration 100, these services can include a message and VoIP service 130, a member portal service 135, a cryptocurrency service 140, a data integrity service 145, and a Push-to-Talk (PTT) service 150. All of the secure services 130-150 can be configured to incorporate biometric security, provided via the biometric authentication gateway 125, in their operation.

Figure 2:
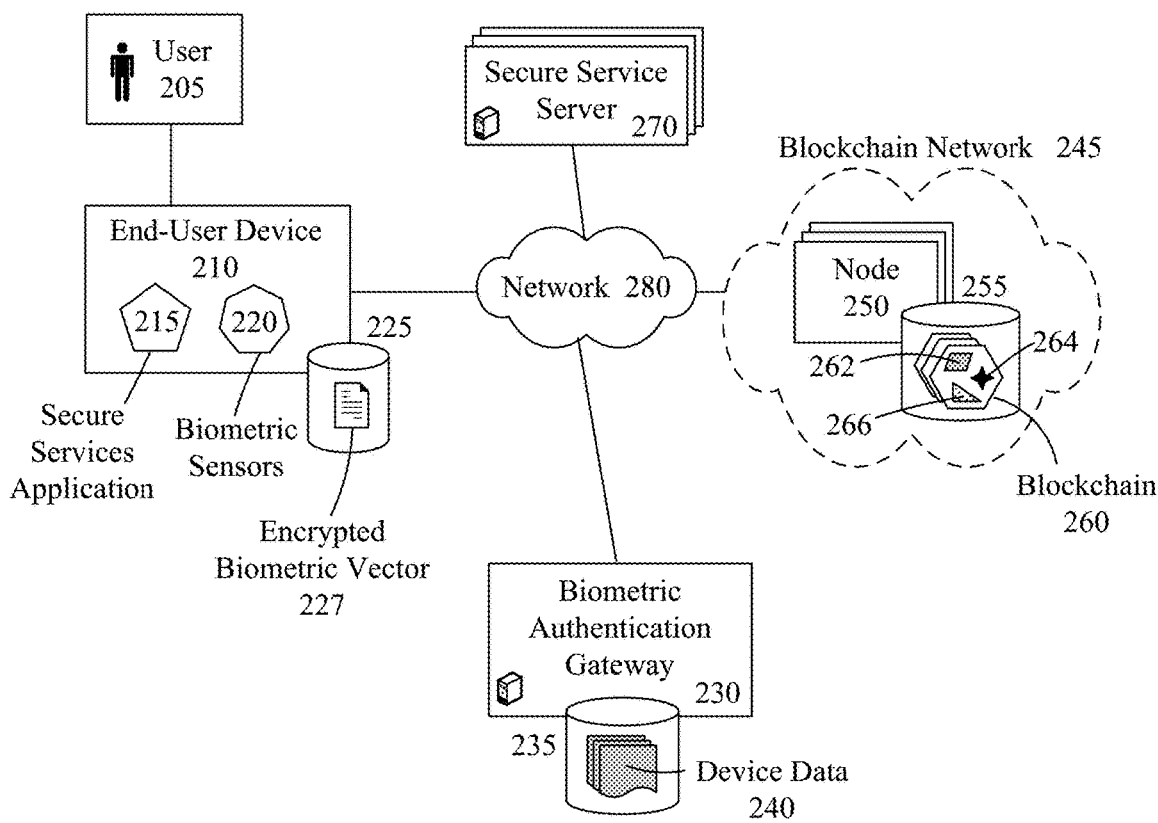
FIG. 2 is a block diagram of a system that implements a secure computer system architecture in accordance with embodiments of the inventive arrangements disclosed herein.

FIG. 2 is a block diagram of a system 200 that implements a secure computer system architecture in accordance with embodiments of the inventive arrangements disclosed herein. System 200 can represent an embodiment of the secure computing architecture of illustration 100.

In system 200, a user 205 can utilize a secure services application 215 running on their end-user device 210 to interact with a biometric authentication gateway 230 in order to access the services provided by the secure service servers 270. The end-user device 210 can be a computing device capable of network 280 communications including, but not limited to, a mobile device, a smartphone, a laptop computer, a desktop computer, a tablet computer, a notebook computer, and the like.

The end-user device 210 can include one or more biometric sensors 220 for capturing the user's 205 biometric data as well as a data store 225 for storing the user's 205 biometric vector 227. Examples of a biometric sensor 220 can include, but are not limited to, a digital camera, a microphone, an infrared sensor, a fingerprint reader, and the like. The end-user device 210 can also include any required processing software required by the biometric sensors 220.

The secure services application 215 can provide the user 205 with the means to interact with the components comprising the RISEN in order to utilize the provided secure services as shown in illustration 100. The secure services application 215 can encompass all the functionality required to interact with the RISEN components. For example, the secure services application 215 can include a cryptocurrency wallet component in order for the user 205 to interact with the blockchain network 245.

These secure services can be represented by corresponding secure service servers 270 and can include interaction with the blockchain network 245. Requests to access the secure service servers 270 and/or perform functions that utilize the blockchain network 245 can require the biometric authentication gateway 230 to perform the real-time verification of the user's 205 encrypted biometric vector 227. The user's 205 biometric vector 227 can be established during enrollment with the biometric authentication gateway 230. The biometric vector 227 can be a unique digital file synthesized from one or more items of the user's 205 biometric data, as captured by the biometric sensors 220 inherent in and/or attached to the end-user device 210.

Because the biometric vector 227 is stored local to the end-user device 210, it can recommended that it be encrypted for additional security. It can be further recommended that a fuzzy vault encryption technique be utilized that is based upon the user's 205 biometric vector 227. A specific polynomial function can be selected and used to project the data of the biometric vector 227 into a set of points. This set of points can then be hidden within a large number of extraneous points (i.e., chaff) to construct the fuzzy vault. Given that the vault contains a set of points that map to a specific set of biometric features, only a similar set of biometric features can be used to unlock the fuzzy vault using polynomial interpolation.

The biometric authentication gateway 230 can be a remotely-located computing device configured to provide a multi-level biometrics-based security protocol for end-user device 210 interactions and to act as a validating authority for the user's 205 biometric vector 227. The biometric authentication gateway 230 can allow/deny access to the services of the secure service servers 270 and/or blockchain network 245 based upon the outcome of the validation of the user's 205 biometric vector 227. The biometric authentication gateway 230 can utilize the Biometric Open Protocol Standard (BOPS), IEEE-2410. The biometric authentication gateway 230 can also utilize hardware and/or software components that provide a predefined acceptable level of security.

The biometric authentication gateway 230 can include a data store 235 where device data 240 for enrolled users 205 is stored. The device data 240 can represent stored information that relates the user 205 and their end-user device 210 in a non-sensitive manner. That is, the information used to relate the user 205 and their end-user device 210 can be specific to the biometric authentication gateway 230 and/or based upon non-personal data such that unauthorized access to the device data 240 does not provide a direct link to the user 205 and/or their end-user device 210.

Additionally, the device data 240 can store other, non-personal information associated with the user 205, such as, but not limited to one or more segments of the user's 205 private encryption key, the user's 205 public blockchain address, the password for their personal secure sockets layer (SSL) certificate, and the like.

It should be noted that the biometric authentication gateway 230 does not store data of a sensitive nature that would expose the user 205 to exploitable vulnerabilities if compromised. Additionally, communications between the user's 205 end-user device 210 and the biometric authentication gateway 230 can utilize mutual (two-way) authentication and 571-bit SSL elliptic curve transport layer encryption.

The blockchain network 245 can be utilized for its inherent high level of data security. As is known in the Art, a blockchain network 245 can be comprised of nodes 250 that validate and store transactions as mathematically-linked blocks in a chain—the blockchain 260; each node 250 storing at least a portion of the blockchain 260 in an associated data store 255. The blockchain network 245 can be capable of supporting non-native applications, digital contracts, and non-native tokens, such as ETHEREUM, STELLAR, NEO, NEM, QTUM, HYPERLEDGER, CARDANO, EOS, QUORUM, and the like. In one embodiment, the end-user device 210 can also function as a node 250 of the blockchain network 245.

The blockchain 260 can be used to store device ownership information 262 and one or more parts 264 of the user's 205 private encryption key for recovery purposes. Additionally, the RISEN can utilize the blockchain network 245 to specific non-native tokens for accessing/purchasing its secure services. The secure services application 215 can allow the user 205 to place a biometric lock 266 upon their non-native tokens, requiring the blockchain network 245 to trigger biometric authentication of the token-owner should a transaction that transfers ownership of the non-native tokens occur.

In a high-security embodiment of system 200, the end-user device 210 and biometric authentication gateway 230 can utilize an operating system having a higher degree of security than most commercially-available operating systems, such as the INTEGRITY real-time operating system (RTOS).

As used herein, presented data stores 225, 235, and 255 can be a physical or virtual storage space configured to store digital information. Data stores 225, 235, and 255 can be physically implemented within any type of hardware including, but not limited to, a magnetic disk, an optical disk, a semiconductor memory, a digitally encoded plastic memory, a holographic memory, or any other recording medium. Data stores 225, 235, and 255 can be a stand-alone storage unit as well as a storage unit formed from a plurality of physical devices. Additionally, information can be stored within data store 225, 235, and 255 in a variety of manners. For example, information can be stored within a database structure or can be stored within one or more files of a file storage system, where each file may or may not be indexed for information searching purposes. Further, data stores 225, 235, and/or 255 can utilize one or more encryption mechanisms to protect stored information from unauthorized access.

Network 280 can include any hardware/software/and firmware necessary to convey data encoded within carrier waves. Data can be contained within analog or digital signals and conveyed though data or voice channels. Network 280 can include local components and data pathways necessary for communications to be exchanged among computing device components and between integrated device components and peripheral devices. Network 280 can also include network equipment, such as routers, data lines, hubs, and intermediary servers which together form a data network, such as the Internet. Network 280 can also include circuit-based communication components and mobile communication components, such as telephony switches, modems, cellular communication towers, and the like. Network 280 can include line based and/or wireless communication pathways.

Figure 3:
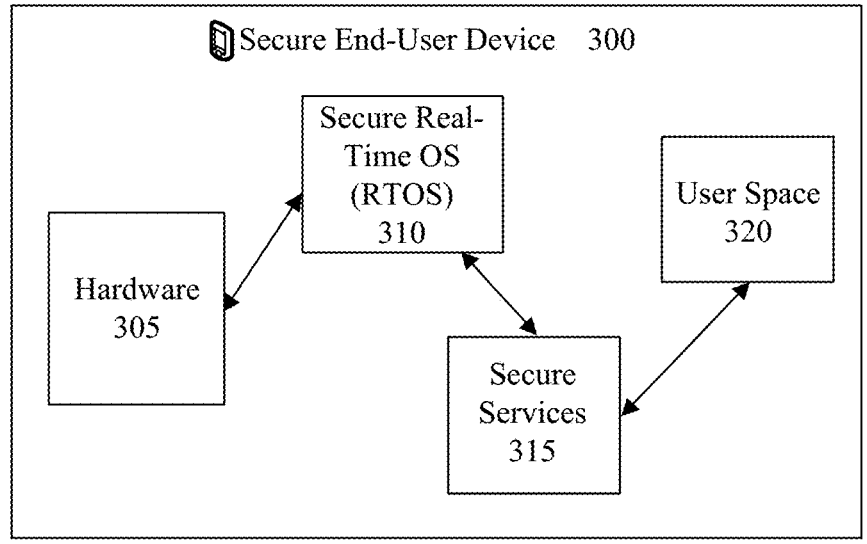
FIG. 3 illustrates the basic internal communication architecture of a secure end-user device in accordance with embodiments of the inventive arrangements disclosed herein.

FIG. 3 illustrates the basic internal communication architecture of a secure end-user device 300 in accordance with embodiments of the inventive arrangements disclosed herein. The secure end-user device 300 can represent the INTEGRITY computer or BIBLOS device of FIG. 1 and can be used as the end-user device of system 200.

The secure end-user device 300 can be comprised of hardware 305, a secure real-time OS (RTOS) 310 like INTEGRITY, a set of secure services 315, and a user space 320. The hardware 305 can represent the various electronic components and circuitry that comprise the end-user device 300. The secure RTOS 310 can represent a software application designed to securely manage the resources provided by the hardware 305 like CPU cycles and memory.

The user space 320 can be an abstraction that represents the memory area where user software applications execute. The software applications of the user space 320 can be directly installed by the user (i.e., applications the user purchases and downloads from an app store) or the manufacturer/seller of the end-user device 300 (i.e., the phone feature that is immediately available on a smartphone). Further, the user space 320 can include auxiliary applications like drivers or libraries that a software application needs to function.

Communications from the user space 320 to the secure RTOS 310 or hardware 305 can be required to be assessed by the set of secure services 315. It should be noted that the secure services 315 running local to the secure end-user device 300 are separate than the secure services provided by the RISEN. That is, the secure services 315 on the end-user device 300 can perform specialized local device functions like password management or firewall security; interaction with a secure service provided by the RISEN can occur, but is not assumed or necessarily required.

In a conventional end-user device, elements in the user space 320 can communicate directly with the OS or hardware components, allowing those components to be compromised. The set of secure services 315 can determine if the interaction with the secure RTOS 310 or hardware 305 requested by the user space 320 is potentially-detrimental. Further, depending on the level of privilege associated with the requested interaction, the secure services 320 can require biometric verification of the user's identity.

For example, the user can attempt to access session management functions for the secure end-user device 300. The information handled by these functions can be sensitive and should restricted to only the user. Therefore, one of the secure services 315 can be designed to request immediate biometric verification of the user's biometric vector before allowing access.

By eliminating the ability for software applications installed within the user space 320 to freely interact with the secure RTOS 310 and hardware 305, the overall security of the secure end-user device 300 can be improved without requiring additional hardware or redesigning the user space 320.

Figure 4:
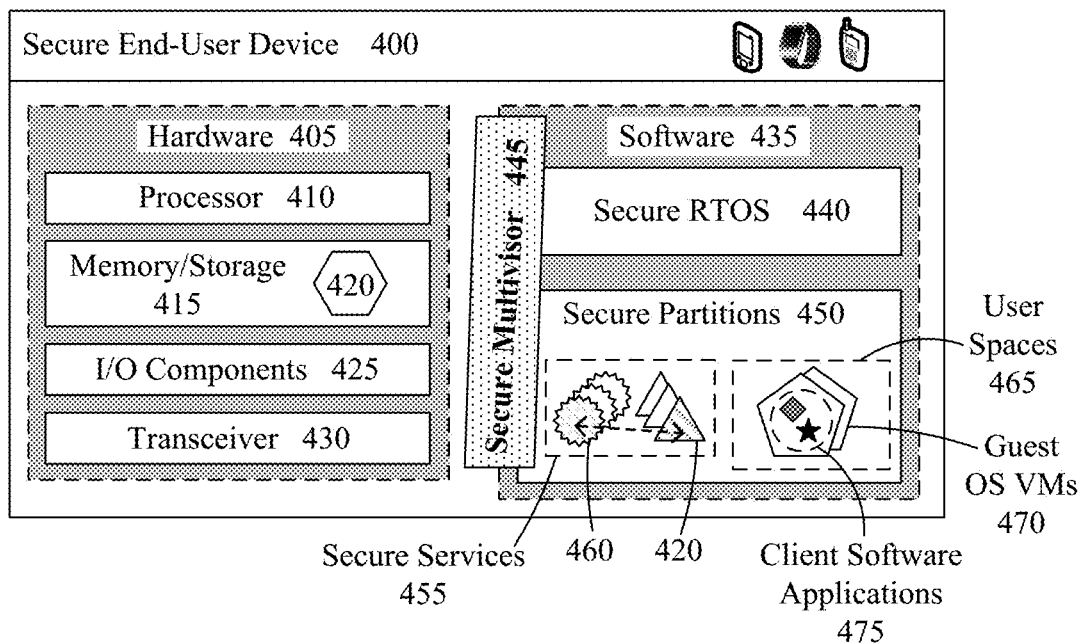
FIG. 4 is a schematic diagram of a secure end-user device for use with the secure computer system architecture in accordance with embodiments of the inventive arrangements disclosed herein.

FIG. 4 is a schematic diagram of a secure end-user device 400 for use with the secure computer system architecture in accordance with embodiments of the inventive arrangements disclosed herein. The secure end-user device 400 can represent a specific embodiment of the HOYOS BIBLOS device or INTEGRITY computer from FIG. 1.

The secure end-user device 400 can be comprised of hardware 405 and software 435 components. The hardware 405 can include one or more processors 410, memory and storage 415, input/output (I/O) components 425, a transceiver 430, and the like. A processor 410 can refer to a central processor unit (CPU) that executes the machine-readable instructions of software 435 by performing arithmetical, logical, and input/output operations. Multiple processor 410 components can be used to increase computing power and distribute load. Further, specialized or dedicated processors 410 or processor 410 areas can be used to handle specific functions, such as a secure area of a main processor 410 for creating a Trusted Execution Environment (TEE).

INTEL SKYLAKE processors 410 can be preferred as they feature Software Guard eXtensions, SGX, which supports Trusted Execution Environment (TEE). TEEs are secure environments where both the code and the data the code works with are protected to ensure their confidentiality (nothing else on the system can spy on them) and integrity (any tampering with the code or data can be detected). SGX is used to create what are called enclaves: secure blocks of memory 415 containing code and data. The contents of an enclave are transparently encrypted every time they're written to RAM and decrypted on being read. The processor 410 governs access to the enclave memory: any attempt to access the enclave's memory 415 from outside the enclave should be blocked.

The value that SGX offers is that it allows these secure environments to be created without having to trust the integrity of the secure RTOS 440, multivisor 445, or any other layers of the system. The processor 410 itself validates and protects the enclave; so as long as the processor 410 is trusted, the enclave can be trusted.

The memory/storage 415 can be used to store the machine-readable instructions of software 435. Memory/storage 415 can include volatile and non-volatile elements as well as non-transitory and removable media.

The I/O components 425 can represent a variety of means for receiving input data and presenting output data. Examples of I/O components 425 can include, but are not limited to, a microphone, a speaker, a display, a keyboard, a touchscreen, a digital camera, sensors, and the like. The I/O components 425 included in the secure end-user device 400 can support the functions of the software 435 and/or secure services 455.

For example, a biometric authentication service 460 can utilize facial recognition. Therefore, the I/O components 425 can be required to include a camera to take the user's picture and facial recognition software 435 to process the image.

The transceiver 430 can be a component able to wirelessly transmit and receive data. Multiple transceivers 430 can be included in the secure end-user device 400 to allow multiple means of connectivity. In such an embodiment, the secure end-user device 400 can be configured to utilize available communications networks in accordance with predefined rules and/or user-configured preferences.

The software 435 components of the secure end-user device 400 can represent the machine-readable instructions that are stored in the memory/storage 415 and cause the secure end-user device 400 to perform various tasks when executed by the processor 410. The primary software 435 components can include a secure real-time operating system (RTOS) 440, a secure multivisor 445, and secure partitions 450.

The secure RTOS 440 can represent the system program that manages the resources, hardware 405 and software 435, of the secure end-user device 400 and provides common services for the secure multivisor 445 and secure partitions 3450. The INTEGRITY RTOS can be the preferred secure RTOS 310. The INTEGRITY RTOS can be a secure EAL 6+ certified Operating Systems developed by Green Hills Software. The HOYOS INTEGRITY CORPORATION can have the exclusive rights to use this operating system in its various end-user devices (i.e., BIBLOS devices and INTEGRITY computer).

The INTEGRITY RTOS 440 was designed so that embedded developers could ensure their applications met the highest possible requirements for security, reliability, and performance. To achieve this, the INTEGRITY RTOS 440 uses hardware memory protection to isolate and protect embedded applications. Secure partitions 450 guarantee each task has the resources it needs to run correctly and to fully protect the secure RTOS 440 and user tasks from errant and malicious code—including denial-of-service attacks, worms, and Trojan horses.

The secure multivisor 445 can represent the hardware and/or software components necessary to create and manage virtualizations, the secure partitions 450, like the INTEGRITY MULTIVISOR. In the Art, other terms for the secure multivisor 445 can be hypervisor or virtual machine monitor (VMM). The secure partitions 450 can be virtual containers that separate functions and/or data. Each secure partition 450 can have its own set of dedicated hardware 405 resources; this hardware 405 separation can be enforced by the secure multivisor 445 as well as a feature of the processor 410.

The secure partitions 450 can be used to host the local secure services 455, including their corresponding critical data 420, such as the user's biometric vector, and user spaces 465. The secure services 455 can represent core features and value-added services that improve and support security of the end-user device 400. Examples of secure services 455 can include, but are not limited to, a secure keyboard, a session manager, firewall and/or proxy services, encryption services, a password manager, threat analysis, intrusion detection, a golden image service, a content storage service, and the like.

For example, a biometric security service 460 can be a secure service 455 that is utilized to capture biometric data for the user, generate a biometric vector and verify the generated biometric vector against the user's stored biometric vector 420. The user's biometric vector 420 can be stored in a secure partition 450 separate from the biometric security service 460, protecting this critical data 420 from unauthorized access from other secure partitions 450 (access to the secure partition 450 housing the biometric vector 420 can be enforced by the secure multivisor 445).

The biometrics used to define the user's biometric vector 420 can include, but are not limited to, a near-infrared (NIR) iris scan, a fingerprint, handprint, or a combination thereof, a DNA profile, facial recognition, voice recognition, and the like. Capture of these biometrics can require the secure end-user device 400 to include additional and/or specific I/O components 425.

The biometric security service 460 of this example can be used locally as a means to safeguard access to other secure services 455, data, client software applications 475, the secure multivisor 445, secure RTOS 440 functions, hardware 405 components, and/or the secure end-user device 400 as well as interact with the biometric authentication gateway. Different levels of biometric identification can be required to access different items. For example, accessing a locked secure end-user device 400 can require fingerprint verification, while updating the biometric vector 420 can require fingerprint verification and facial recognition.

In another contemplated embodiment, the biometric security service 460 can be used to secure access to files stored in the memory/storage 415 of the secure end-user device 400. These files can be system files and/or files generated by client software applications 475.

In another embodiment, the biometric security service 460 can be used to secure communication functions (e.g., voice chat, text chat, video chat, etc.) of a client software application 475 (e.g., SKYPE, FACEBOOK, INSTAGRAM, SNAPCHAT, etc.) or as part of the secure services (e.g., voice communication, text messaging, video conferencing, etc.) provided by the RISEN to the secure end-user device 400. For example, placing a phone call can require the user to pass voice recognition, allowing only the user of the secure end-user device 400 to make calls.

In yet another contemplated embodiment, the biometric security service 460 can incorporate user-group level rules. For example, the secure end-user device 400 can be a shared resource among a team of users. The biometric security service 460 can restrict access to only this group. Additional granularity of access privileges within the group can also be supported.

In still another embodiment, the biometric security service 460 can work in conjunction with a location service (e.g., GPS, RF Triangulation, fixed RF/Audio beacons, camera/video acquisition w/computer vision, etc.) to secure applications 475, content (data) and communications functionality of the secure end-user device 400. Thus, access can be governed by geographic location in addition to the biometric vector 420 of the user.

A user space 465 secure partition 450 can be used to host a virtual machine (VM) 470 running a guest operating system (OS). The guest OS can be different than the secure RTOS 440, such as ANDROID OS. The user of the secure end-user device 400 can install various client software applications 475 within the guest OS VM 470.

Multiple guest OS VMs 470 can be instantiated on the secure end-user device 400. The guest OSes can be the same or different. In this situation, each guest OS VM 470 can represent the logical and functional separation of personal client software applications 475 from business or enterprise client software applications 475. This separation can further improve the security for enterprise applications 475 as failures or compromises perpetrated by personal client software applications 475 cannot affect the enterprise client software applications 475.

Further, multiple enterprise guest OS VMs 470 can operate on the secure end-user device 400, representing distinct sets of enterprise client software applications 475. In such a situation, the secure services 455 can apply different security policies to each enterprise guest OS VM 470. That is, one enterprise guest OS VM 470 can be more restricted (have a greater degree of security) than the other. Such an approach can allow for enterprise client software applications 475 that require a greater level of security to operate without over-restricting other applications 475.

In another embodiment, a user space 465 running a guest OS VM 470 can be used to virtualize peripheral device drivers to other guest OS VMs 470 to avoid redundant virtualizations of the peripheral device drivers in multiple user spaces 465.

In essence, the typical user environment experienced when using a smartphone can be virtualized in the user space 465 secure partition 450. When a client software application 475 or the VM 470 needs to interact with the secure RTOS 440, the interaction can be first scrutinized by the appropriate secure services 455. Requested interactions of specific privilege levels can require immediate biometric vector verification of the user via the biometric security service 460 and corresponding biometric authentication gateway. Because the user space 465 is isolated from the secure RTOS 440 and other secure partitions 450, any compromised client software applications 475 used in the user space 465 cannot affect the data and/or processes of the other secure partitions 450 and/or the secure RTOS 440.

Figure 5:
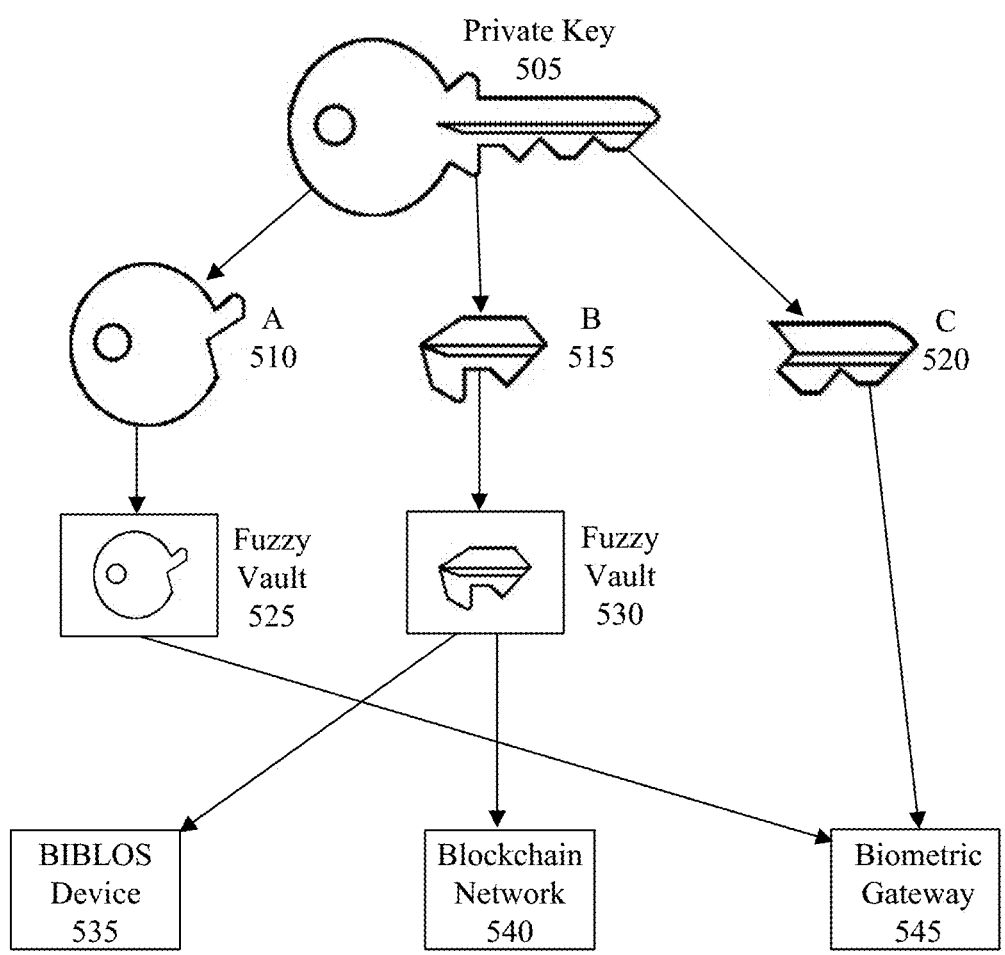
FIG. 5 presents an illustration depicting the improved security for the user's private encryption key in accordance with embodiments of the inventive arrangements disclosed herein.

FIG. 5 presents an illustration depicting the improved security for the user's private encryption key 505 in accordance with embodiments of the inventive arrangements disclosed herein. This improved security approach can be utilized within the context of the secure computer system architecture.

As is known in the Art, public-key infrastructure (PKI) communications can be based upon a public-private pair of encryption keys. While the public encryption key is openly distributed, it can be critical that the user's private encryption key 505 remain protected, as it is possible for anyone with the user's private encryption key 505 to impersonate said user. Thus, the approach for many security attacks can be to gain access to private encryption keys 505, either directly or through the software that maintains them.

Therefore, it can be of utmost importance to improve how a user's private encryption key 505 is safeguarded within the secure computer system architecture. In this improved approach, the user's generated private encryption key 505 can be split into three parts—A 510, B 515, and C 520. Parts A 510 and B 515 can be further protected via encryption, such as the fuzzy vault scheme.

In this improved approach, the fuzzy vault 525 and 530 can be based upon all or part of the data contained in the user's biometric vector. That is, to hide the part 510 and 515 of the user's private encryption key 505, a polynomial function can be selected whose coefficients represent each of the characters in the key 505. Then, using the selected function, data from the user's biometric vector can be projected into a set of points which, when combined together with a large number of throw off "chaff" points, comprise the construction referred to as the fuzzy vault 525 and 530. Given that the vault 525 and 530 contains a set of points which map to a particular set of biometric data, only a similar set of data can enable retrieval from the vault 525 and 530, allowing for the original polynomial function and the key part 510 and 515, to be retrieved via polynomial interpolation. In short, the fuzzy vaults 525 and 530 storing the key parts 510 and 515 can only be opened with the user's biometric vector.

To further increase security for the private encryption key 505, each fuzzy vault 525 and 530 can be stored in separate secure locations within the system architecture. In this example, the fuzzy vault 525 housing part A 510 can be stored on the biometric authentication gateway 545 along with part C 520. The fuzzy vault 530 housing part B 515 can be stored local to the BIBLOS device 535 or other secure end-user device. For added security, a copy of part B's 515 fuzzy vault 530 can be stored within the blockchain network 540 like a backup.

If an end-user device of lesser security is used, the fuzzy vault 525 containing part A 510 can be stored on the biometric authentication gateway 545 instead of local to the end-user device, as will be presented in later Figures.

In another embodiment, part C 520 can also be encrypted. Such an embodiment, however, can be more costly in terms of resources as all three parts 510-520 require encryption/decryption. Having 2 of the three parts 510-520 encrypted can be seen as sufficient as access to a single part, C 520, provides no advantage to accessing the other parts 510 and 520.

Figure 6:
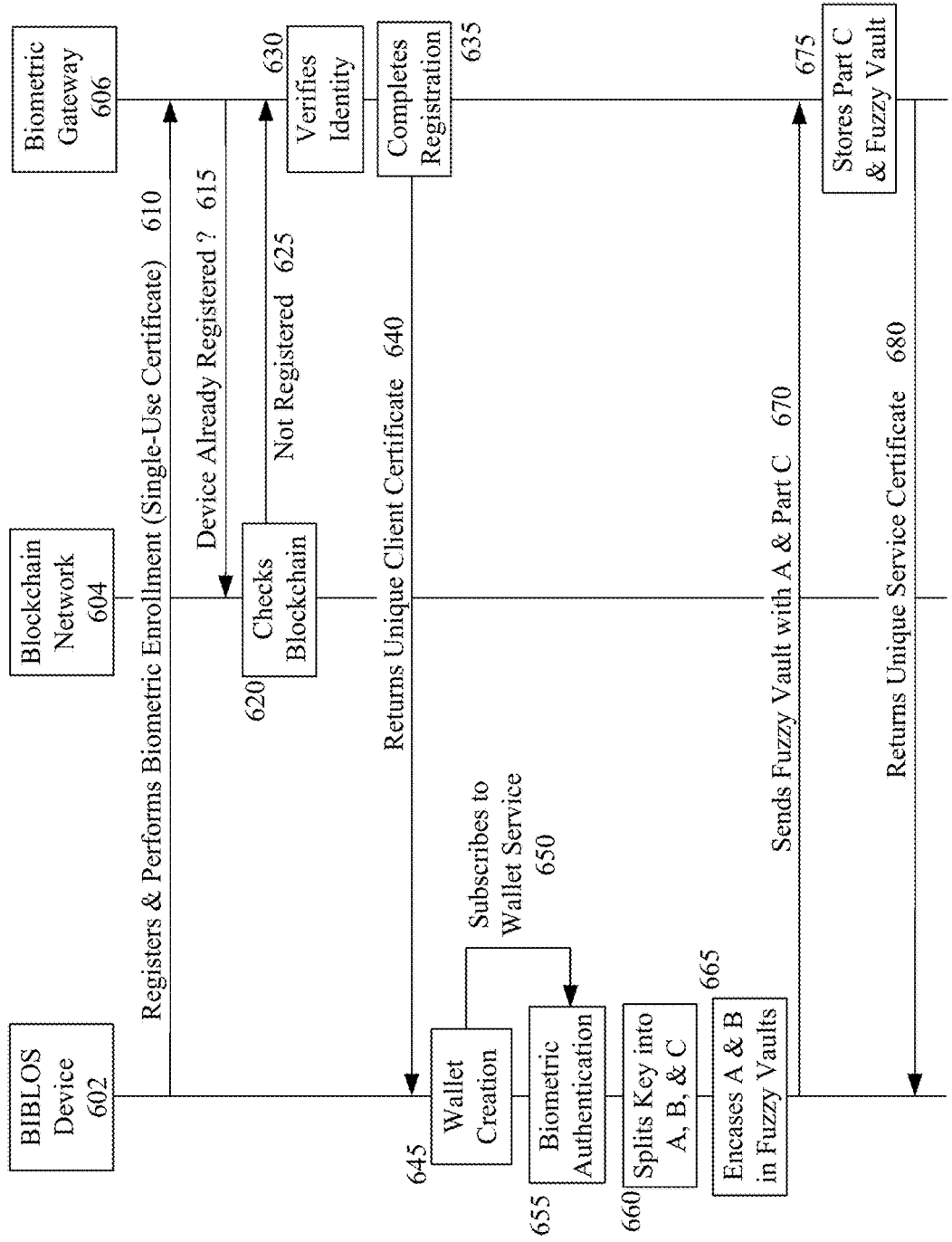
FIG. 6 presents an interaction diagram describing the process of registering a BIBLOS end-user device with the biometric authentication gateway to interact with the RISEN in accordance with embodiments of the inventive arrangements disclosed herein.

FIG. 6 presents an interaction diagram 600 describing the process of registering a BIBLOS end-user device 602 with the biometric authentication gateway 606 to interact with the RISEN in accordance with embodiments of the inventive arrangements disclosed herein. The process described in diagram 600 can be performed within the context of system 200 and/or utilizing the secure computer system architecture presented in FIG. 1.

The process can begin with the BIBLOS end-user device 602, herein referred to as the BIBLOS device 602, registering 610 with the biometric authentication gateway 606, herein referred to as the biometric gateway 606. Actions taken by the BIBLOS device 602 can include use of the secure services application or other software application installed upon the BIBLOS device 602 for interacting with the biometric gateway 606 and/or RISEN.

Registration with the biometric gateway 606 can prompt the user to provide general information like a username and password as well as perform biometric enrollment, which will be described in FIG. 8. The communications exchange during the registration process can utilize a single-use certificate, as is known in the Art, provided to the BIBLOS device 602 by an authorized agent.

The biometric gateway 606 can then query 615 the blockchain network 604 to determine if the BIBLOS device 602 is already registered. To provide an answer, the blockchain network 604 can check 620 the data of the blockchain for information matching the BIBLOS device 602. The blockchain network 604 can provide 625 the biometric gateway 606 with its answer, which is that the BIBLOS device 602 is not already registered for this example.

At this point, the biometric gateway 606 can verify 630 the identity of the user per a third-party service. Upon satisfactory verification of identity, the biometric gateway 606 can complete 635 the registration process by recording all the information that now associates the user's identifying data with the identifying information of their BIBLOS device 602 and their biometrics. The biometric gateway 606 can then return 640 a unique client certificate for the user to the BIBLOS device 602. This client certificate can be used for subsequent communication with the biometric gateway 606.

Return of the client certificate can trigger the BIBLOS device 602 to create 645 the user a cryptocurrency wallet for interacting with the blockchain network 604. Wallet creation 645 can include generating a private encryption key for the user. Once the wallet is created, the user can be subscribed 650 to the RISEN's wallet service. Service subscription can require biometric authentication 655 of the user.

Upon successful biometric authentication, the private encryption key can be split 660 into three parts (A, B, and C) as detailed in FIG. 5. Parts A and B of the private encryption key can be encased 665 within separate fuzzy vaults. The BIBLOS device 602 can then send 670 the fuzzy vault containing part A and part C, unencrypted, to the biometric gateway 606 using the unique client certificate; the fuzzy vault storing part B of the private encryption key can remain stored on the BIBLOS device 602. The biometric gateway 606 stores 375 Part C and the fuzzy vault in their designated locations and returns 680 a unique service certificate for the wallet service to the BIBLOS device 602.

Figure 7:
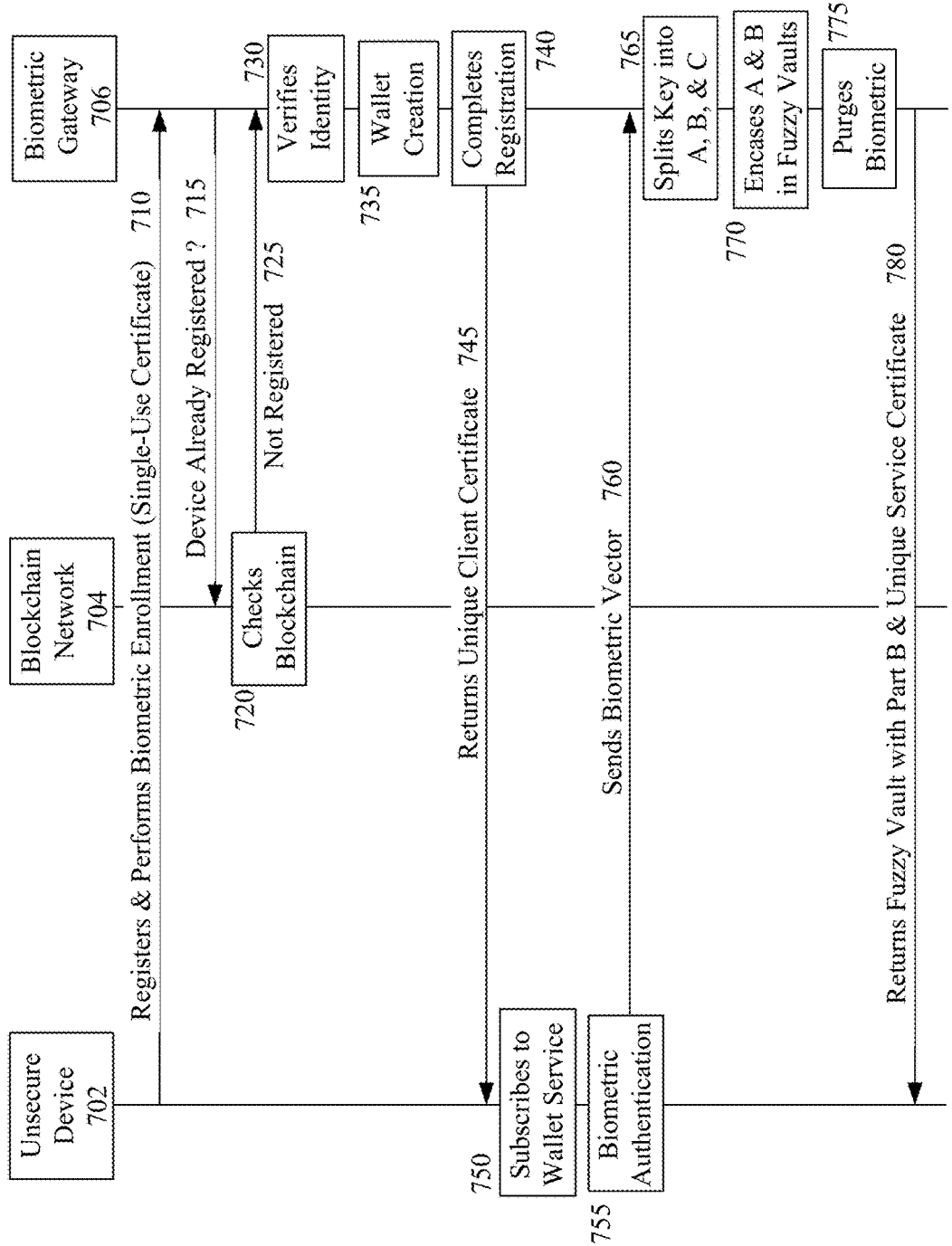
FIG. 7 presents an interaction diagram describing the process of registering an unsecure end-user device with the biometric authentication gateway to interact with the RISEN in accordance with embodiments of the inventive arrangements disclosed herein.

FIG. 7 presents an interaction diagram 700 describing the process of registering an unsecure end-user device 702 with the biometric authentication gateway 706 to interact with the RISEN in accordance with embodiments of the inventive arrangements disclosed herein. The process described in diagram 700 can be performed within the context of system 200 and/or utilizing the secure computer system architecture presented in FIG. 1.

Interaction diagram 700 can be used to emphasize the general process differences when using an unsecure end-user device or an end-user device having a lower degree of security than a BIBLOS device 702. While the basic steps of the process are the same, this difference in security can alter where operations that handle very sensitive information are performed. The process differences between interaction diagrams 600 and 700 can be extrapolated and applied to the remaining processes as only BIBLOS devices are referenced in the remaining Figures.

The process can begin with the unsecure end-user device 702, herein referred to as the unsecure device 702, registering 710 with the biometric authentication gateway 706, herein referred to as the biometric gateway 706. Actions taken by the unsecure device 702 can include use of the secure services application or other software application installed upon the unsecure device 702 for interacting with the biometric gateway 706 and/or RISEN.

Registration with the biometric gateway 706 can prompt the user to provide general information like a username and password as well as perform biometric enrollment, which will be described in FIG. 8. The communications exchange during the registration process can utilize a single-use certificate, as is known in the Art, provided to the unsecure device 702 by an authorized agent.

The biometric gateway 706 can then query 715 the blockchain network 704 to determine if the unsecure device 702 is already registered. To provide an answer, the blockchain network 704 can check 720 the data of the blockchain for information matching the unsecure device 702. The blockchain network 704 can provide 725 the biometric gateway 706 with its answer, which is that the unsecure device 702 is not already registered for this example.

At this point, the biometric gateway 706 can verify 730 the identity of the user per a third-party service. Upon satisfactory verification of identity, the biometric gateway 706 can create 735 the user a cryptocurrency wallet for interacting with the blockchain network 704. Wallet creation 735 can include generating a private encryption key for the user. Once the wallet is created, the registration process can be completed 740; information associating the user's identifying data with the identifying information of their unsecure device 702 and their biometrics can be recorded. The biometric gateway 706 can then return 745 a unique client certificate for the user to the unsecure device 702. This client certificate can be used by the unsecure device 702 for subsequent communication with the biometric gateway 706.

Return of the client certificate can trigger the unsecure device 702 to 7 subscribe 750 to the RISEN's wallet service. Service subscription can require biometric authentication 755 of the user. The biometric vector generated by the unsecure device 702 during authentication can be sent 760 to the biometric gateway 706.

The private encryption key generated during wallet creation 735 can then be split 765 into three parts (A, B, and C) as detailed in FIG. 5. Parts A and B of the private encryption key can be encased 770 within separate fuzzy vaults using the received biometric vector. The biometric gateway 706 can then purge 775 the biometric vector from its memory as an additional safeguard. Lastly, the biometric gateway 706 can return 780 the fuzzy vault containing part B and a unique service certificate for the wallet service to the unsecure device 702; the fuzzy vault storing part A and part C can remain stored on the biometric gateway 706.

The main difference in the process can be the component of the secure computer system architecture that handles the user's private encryption key. With a BIBLOS device 602, private encryption key generation and subsequent handling can occur local to the BIBLOS device 602. With an unsecure device 702, private encryption key handling can be performed by the biometric gateway 706 to reduce the possibility of compromise of the private encryption key by security vulnerabilities inherent to the unsecure device 702.

Figure 8:
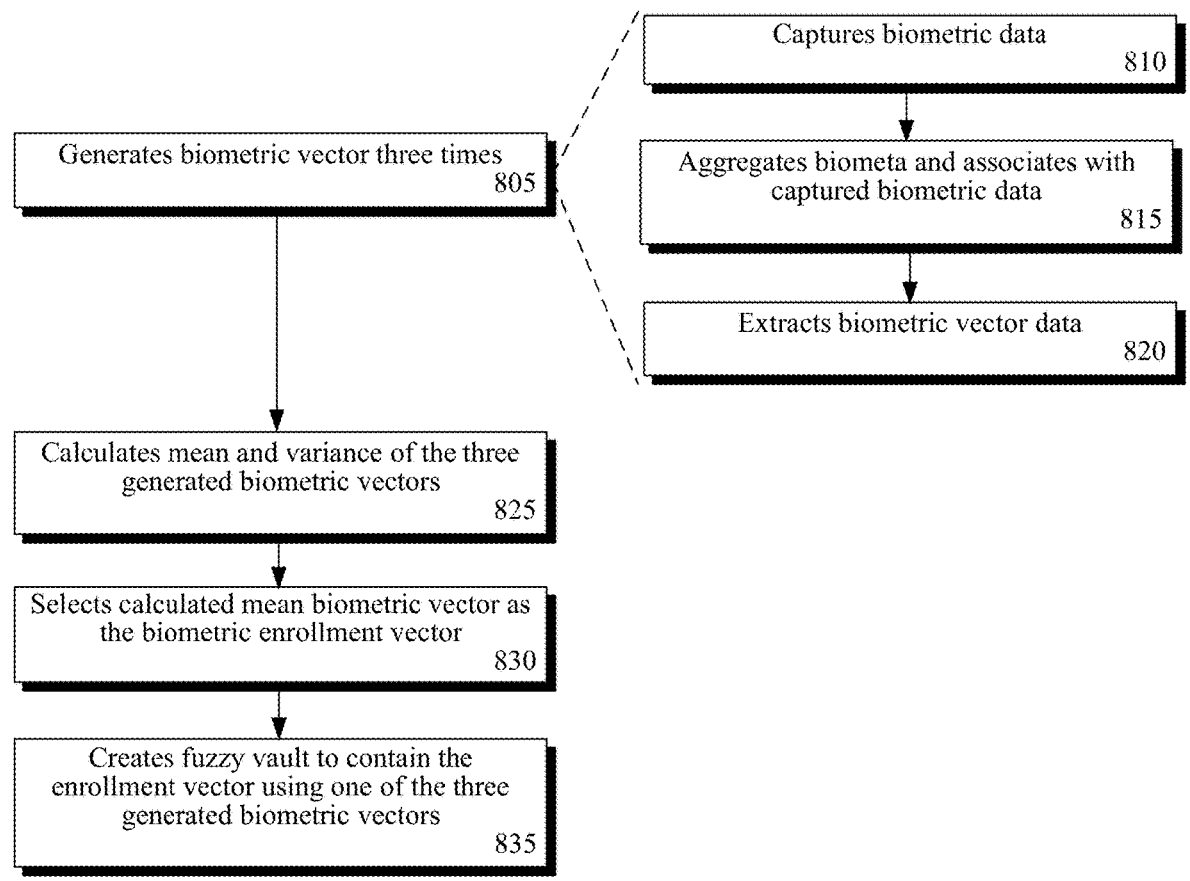
FIG. 8 is a flowchart of a method detailing the biometric enrollment process in accordance with embodiments of the inventive arrangements disclosed herein.

FIG. 8 is a flowchart of a method 800 detailing the biometric enrollment process in accordance with embodiments of the inventive arrangements disclosed herein. Method 800 can be performed within the context of the previous Figures.

Method 800 can begin with step 805 where a biometric vector is generated three times. Step 805 can require the performance of substeps 810-820 in triplicate. Biometric vector generation can first require the user's biometric data to be captured as in substep 810. Substep 810 can also include the performance of any data processing tasks that are necessary to prepare the raw captured data for analysis and consumption.

For example, when using fingerprint biometric data, substep 810 can capture a digital image of the user's finger. Various image processing tasks (e.g., edge detection, illumination normalization, enhancement, resizing, etc.) can then be performed on the captured image to ensure a standard evaluation of the data. The BIBLOS device can utilize a proprietary process called MANO for the capture and authentication of fingerprints.

In substep 815, biometa data can be aggregated from the end-user device for and associated with the captured biometric data. Biometa data can represent metadata regarding the capture of the biometric data, including, but not limited to a timestamp, device identifying information, geolocation data, and the like. The biometa data can be used to ensure that the biometric data is acquired on a real-time basis from a registered device. The biometa data can also provide protection against "replay attacks" where a malicious entity attempts to bypass the biometric authentication by presenting the system data from a previous successful authentication.

Association of the biometa data can take a variety of forms. In an embodiment where the biometric data is an image, the biometa data can be embedded into the image using state-of-the-art steganographic techniques. In another embodiment, the biometa data can be added to a header area of the digital file containing the biometric data like typical metadata.

The data for the biometric vector can then be extracted from the captured biometric data in substep 820. After generation of the three biometric vectors, the mean and variance of the three biometric vectors can be calculated in step 825. In one embodiment, the three biometric vectors can be required to meet a predefined variance else performance of step 805 is repeated until met.

In step 830, the calculated mean biometric vector can be selected as the user's biometric enrollment vector. As used herein, the terms "enrollment biometric vector", "enrollment vector", and "biometric enrollment vector" can be used interchangeably to refer to the biometric vector created for the user during the enrollment process with the biometric authentication gateway. These terms can be necessary to distinguish the biometric enrollment vector from the biometric vectors that are subsequently captured for authentication against the enrollment vector.

A fuzzy vault can then be created in step 835 to contain the enrollment vector. The fuzzy vault can be created using any one of the three generated biometric vectors as any of the three generated biometric vectors are already known to be within variance of the enrollment vector.

It should be noted that the steps of method 800 can be performed by either the user's end-user device or the biometric authentication gateway, depending upon the degree of security provided by the end-user device.

Figure 9:
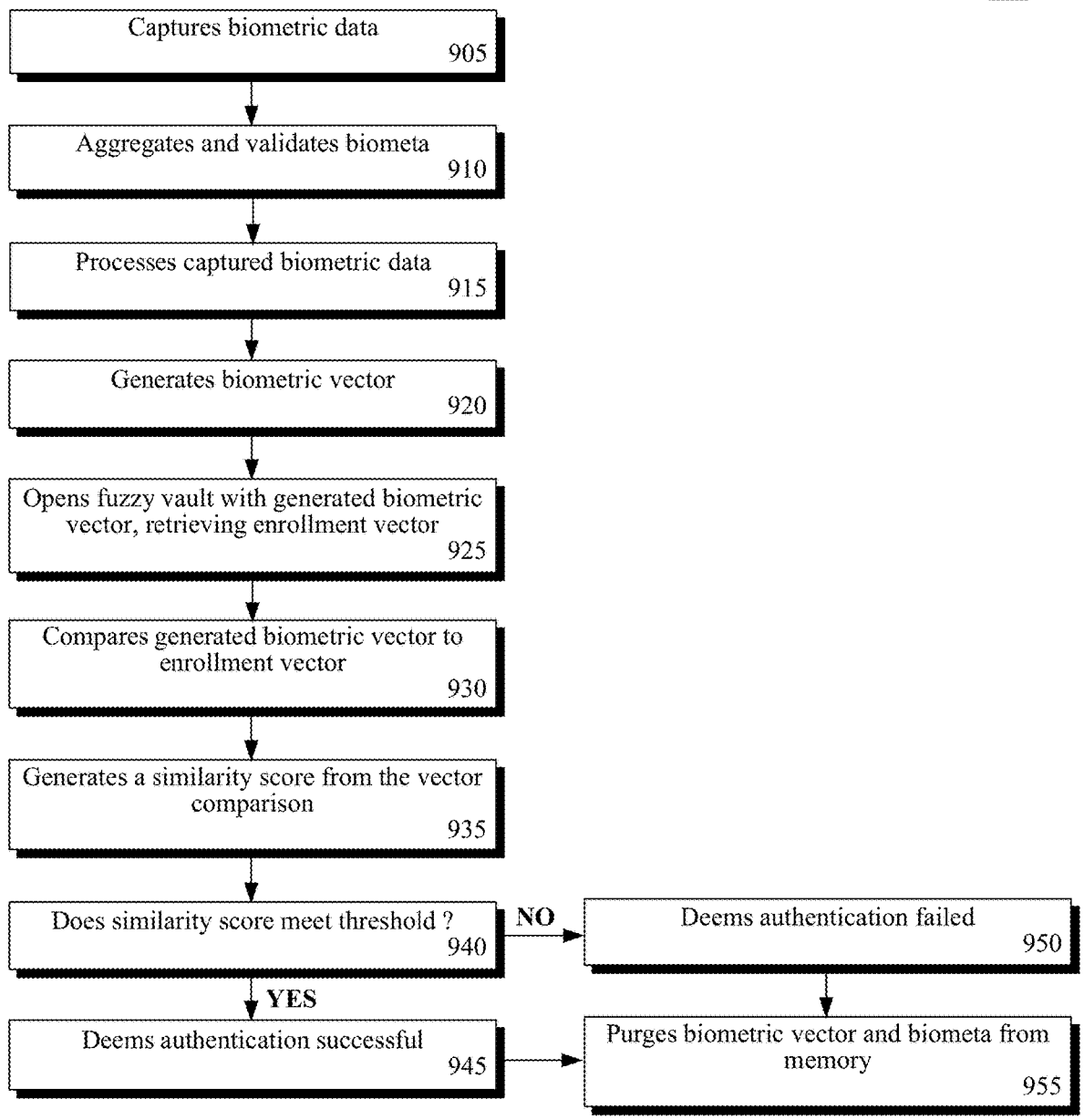
FIG. 9 is a flowchart of a method describing the biometric authentication process in accordance with embodiments of the inventive arrangements disclosed herein.

FIG. 9 is a flowchart of a method 900 describing the biometric authentication process in accordance with embodiments of the inventive arrangements disclosed herein. Method 900 can be performed in the previous and subsequent Figures wherever the biometric authentication task is shown.

Method 900 can begin with step 905 where the user's biometric data is captured via their end-user device. Biometa data for the captured biometric data can be aggregated and validated in step 910. Validation of the biometa data can represent examining the biometa data to ensure that the captured biometric data has been captured in real-time.

In step 915, the captured biometric data can be processed, as necessary, and in the same manner as the enrollment process. The biometric vector can be generated from the processed biometric data in step 920. In step 925, the fuzzy vault containing the user's enrollment vector can be opened using the generated biometric vector to retrieve the enrollment vector. Should the generated biometric vector be unable to open the fuzzy vault (i.e., wrong user for the device, device failure, user error, etc.), steps 905-920 can be repeated a predetermined number of times; continued failure can terminate execution of method 900.

Assuming that the generated biometric vector opens the fuzzy vault, the generated biometric vector can be compared to the retrieved enrollment vector, in step 930. In step 935, a similarity score can generated to quantify how well the generated biometric vector matches the enrollment vector. It can be determined if the generated similarity score meets a predefined threshold value in step 940. The predefined threshold can be defined by the system and can be adjustable by the user in some embodiments.

When the similarity score meets the threshold, step 945 can execute where the biometric authentication is deemed to be successful. When the similarity score does not meet the threshold, the biometric authentication can be deemed a failure, in step 950. From either step 945 or step 950, step 955 can be performed where the generated biometric vector and biometa data can be purged from memory to ensure that they cannot be compromised by an attack to memory.

Figure 10:
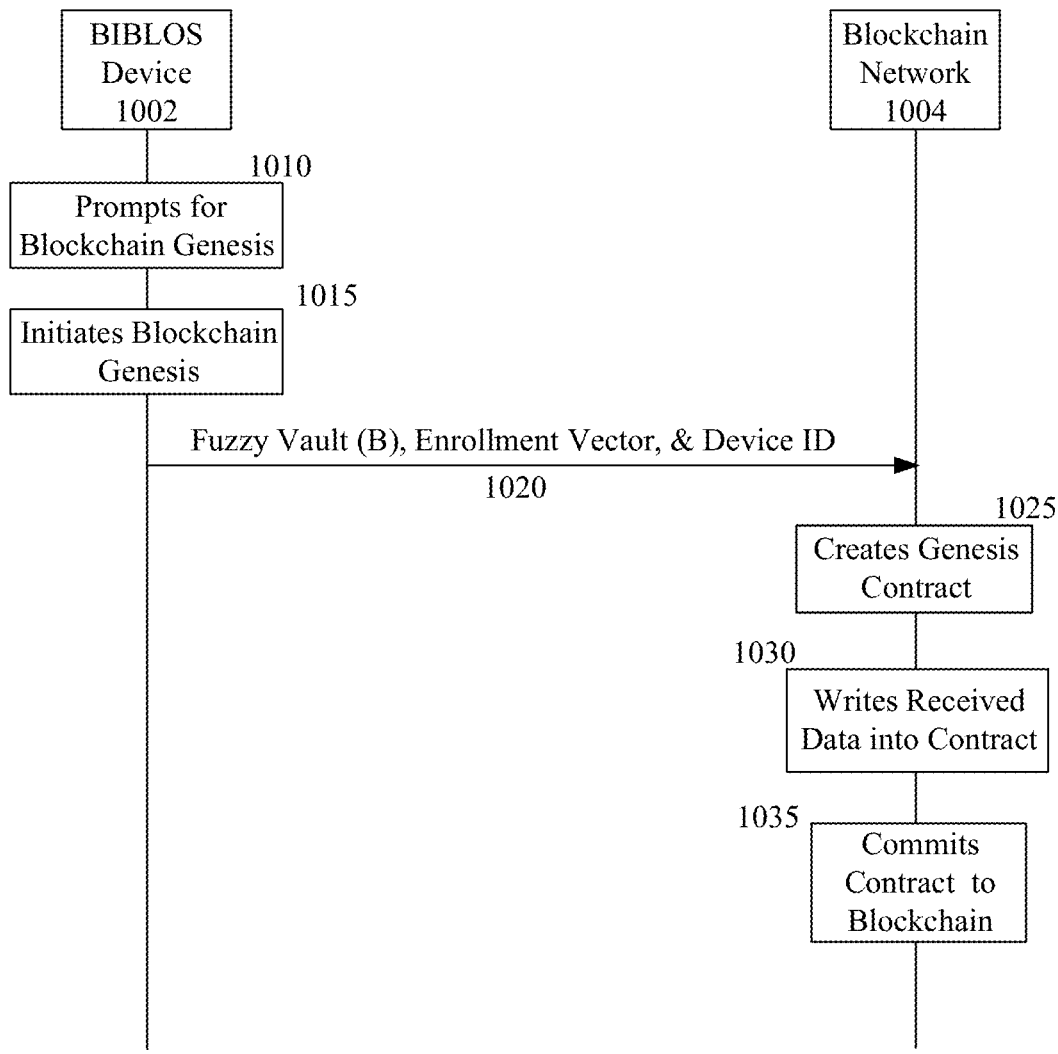
FIG. 10 presents an interaction diagram describing the blockchain genesis process of a BIBLOS end-user device in accordance with embodiments of the inventive arrangements disclosed herein.

FIG. 10 presents an interaction diagram 1000 describing the blockchain genesis process of a BIBLOS end-user device 1002 in accordance with embodiments of the inventive arrangements disclosed herein. The actions presented in interaction diagram 1000 can be performed within the context of the previous Figures.

The BIBLOS device 1002 can prompt 1010 the user to perform blockchain genesis. Prompting can occur when the corresponding software running on the BIBLOS device 1002 detects that blockchain genesis has not yet been performed by the user. The user can also be required to have the expected amount of cryptocurrency within the blockchain network 1004 to perform the blockchain genesis transactions, including native and non-native tokens.

The blockchain genesis process, in general, can represent the steps performed to safeguard sensitive information pertaining to the user and their BIBLOS device 1002 in the blockchain network 1004 for future use (i.e., a secure data backup). The user can initiate 1015 this process via the corresponding user interface on the BIBLOS device 1002. The BIBLOS device 1002 can then send 1020 the blockchain network 1004 the fuzzy vault containing part B of the user's private encryption key, the user's enrollment vector, the unique device ID for the BIBLOS device 1002.

Upon receipt of this data, the blockchain network 1004 can create 1025 a genesis digital or smart contract. The received data can then be written 1030 into the genesis contract. The completed genesis contract can be committed in blockchain per the blockchain network's 1004 validation rules.

Figure 11:
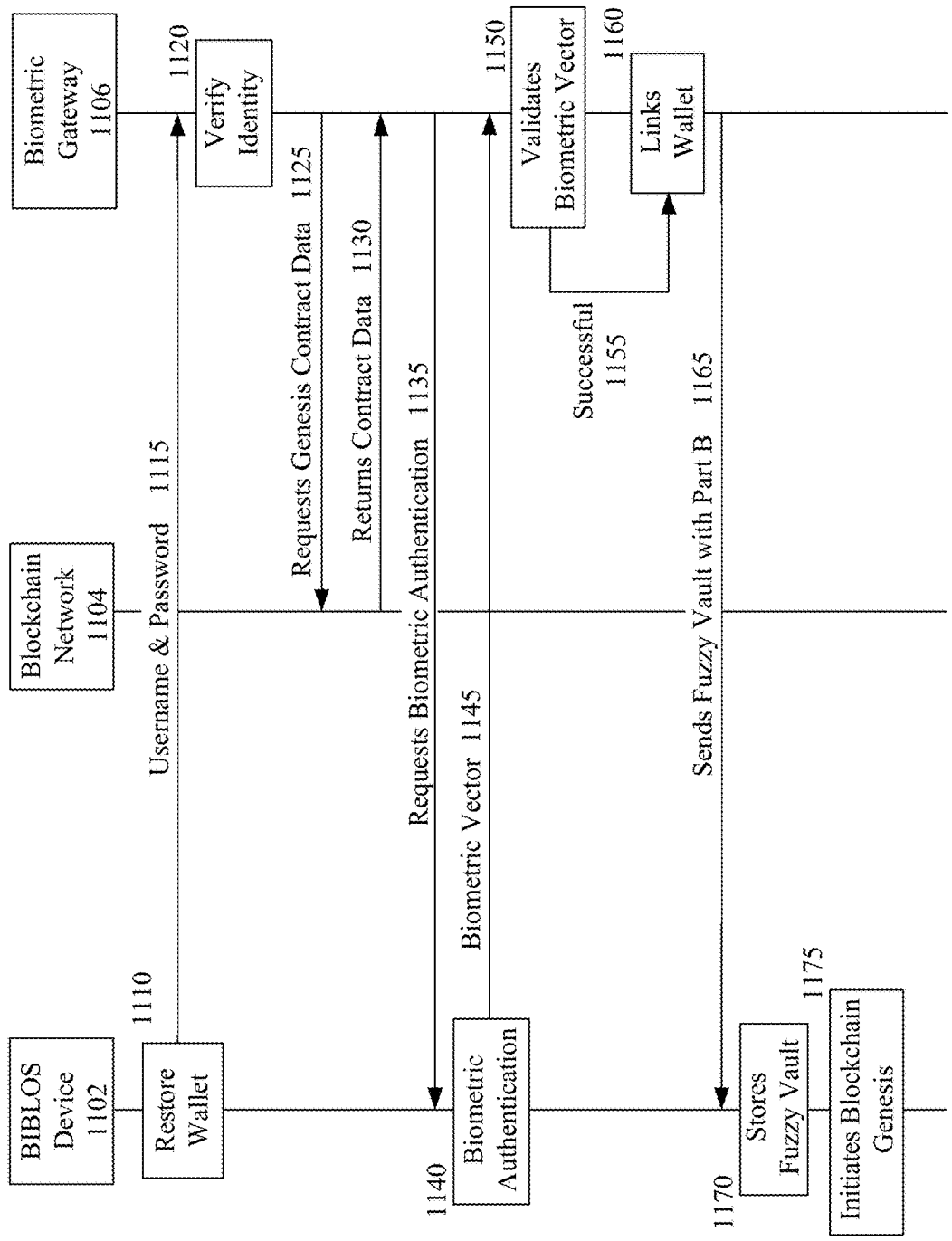
FIG. 11 presents an interaction diagram describing the process to restore data to a new BIBLOS device in accordance with embodiments of the inventive arrangements disclosed herein.

FIG. 11 presents an interaction diagram 1100 describing the process to restore data to a new BIBLOS device 1102 in accordance with embodiments of the inventive arrangements disclosed herein. The actions presented in interaction diagram 1100 can be performed within the context of the previous Figures.

The actions of interaction diagram 1100 can be performed in the event that the user gets a new BIBLOS device 1102 or their existing BIBLOS device 1102 encountered an error or situation that deletes or corrupts the locally-stored data required to interact with the components of the RISEN (i.e., improper shut-down, restoration to a previous configuration, etc.). It can be assumed that the user reinstalls the appropriate software applications (e.g., secure services application 215) require to communication with the blockchain network 1104, biometric gateway 1106, and/or other components of the RISEN.

The user can execute the restore wallet 1110 function on their BIBLOS device 1102 to initiate this process. This function can convey 1115 the user's username and password to the biometric gateway 1106 for their existing account. The biometric gateway 1106 can then verify 1120 the user's identity via the designated third-party service, similar to the registration process.

Because the user/BIBLOS device 1102 has already performed blockchain genesis, as described in interaction diagram 1000, the biometric gateway 1106 can request 1125 the user's genesis contract data that is stored in the blockchain from the blockchain network 1104. The blockchain network 1104 can retrieve and return 1130 the genesis contract data—the fuzzy vault containing part B of the user's private encryption key, the user's enrollment vector, and the device ID of the previous BIBLOS device—to the biometric gateway 1106.

Next, the biometric gateway 1106 can send 1135 the BIBLOS device 1102 a request for biometric authentication from the user. The user can use the BIBLOS device 1102 to perform the biometric authentication 1140 process. The biometric vector generated by biometric authentication 1140 can be sent 1145 to the biometric gateway 1106.

The biometric gateway 1106 can validate 1150 the received biometric vector against the retrieved user's enrollment vector. Successful 1155 validation of the received biometric vector can trigger the biometric gateway 1106 to link 1160 the user's cryptocurrency wallet with the new BIBLOS device 1102 identifying information. Linking 1160 the cryptocurrency wallet can update the data stored by the biometric gateway 1106.

Since successful 1155 validation of the user's biometric vector indicates that the actual user sanctions the restore process, the biometric gateway 1106 can then send 1165 the fuzzy vault housing part B of the user's private encryption key to the BIBLOS device 1102. The BIBLOS device 1102 can store 1170 the received fuzzy vault in the appropriate location and automatically trigger blockchain genesis 1175 to update the device ID stored in the genesis contract.

Figure 12:
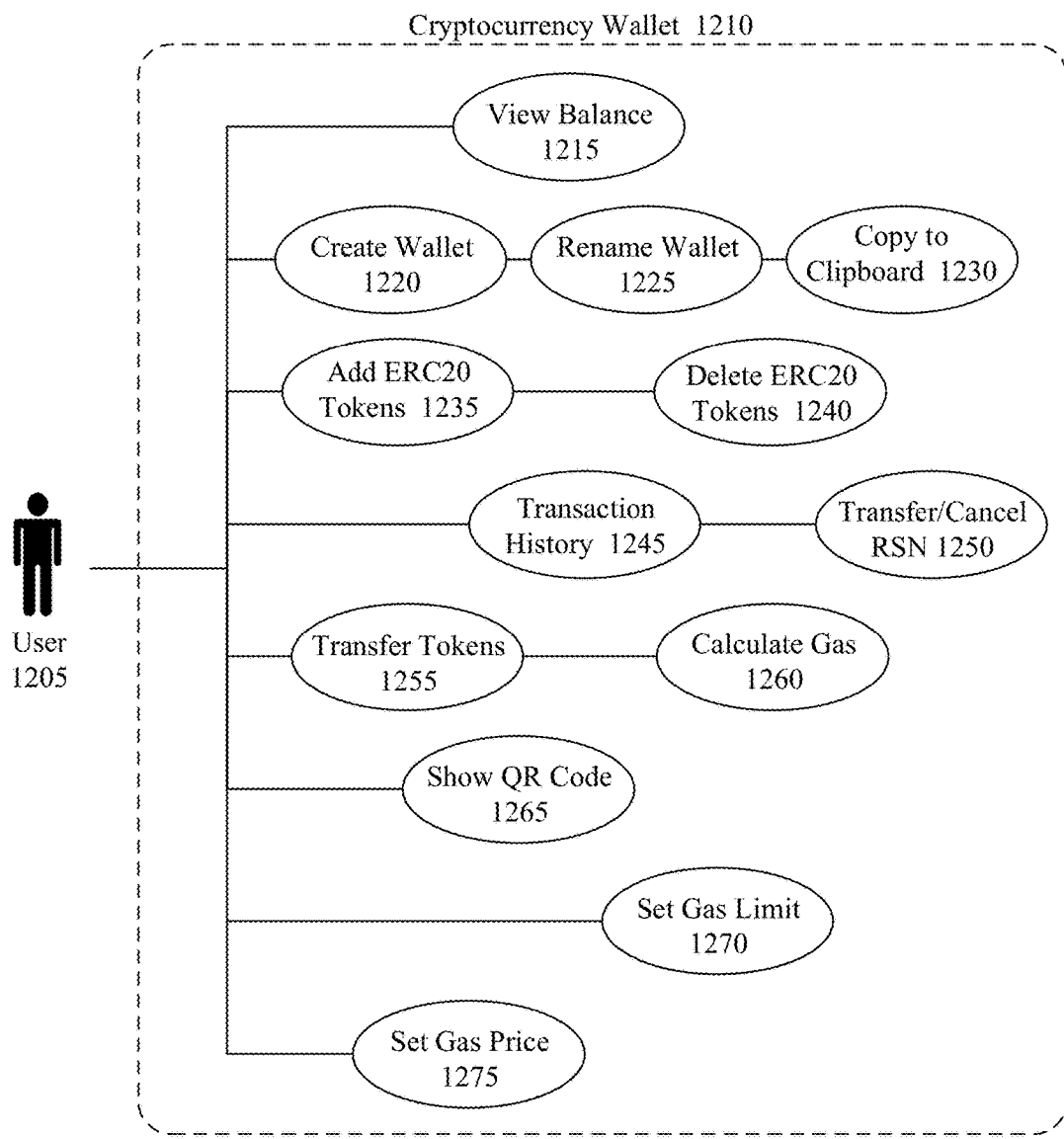
FIG. 12 is a feature diagram for the cryptocurrency wallet application in accordance with embodiments of the inventive arrangements disclosed herein.

FIG. 12 is a feature diagram 1200 for the cryptocurrency wallet application 1210 in accordance with embodiments of the inventive arrangements disclosed herein. The example features presented in diagram 1200 can be performed within the context of the previous Figures.

The cryptocurrency wallet 1210 can represent the set of functions for interacting with the blockchain network available in the secure services application. This set of functions can be packaged as a distinct software application or as a module of the secure services application.

Via the cryptocurrency wallet 1210 the user 1204 can have access to a variety of features 1215-1275 that are allowed and/or required for interaction within the RISEN. These features can represent basic blockchain network operations: view balance 1215, create wallet 1220, rename wallet 1225, add ERC20 tokens 1235, delete ERC20 tokens 1240, transaction history 1245, and transfer tokens 1255; non-native blockchain application operations: transfer/cancel a RISEN token transaction 1250, calculate gas 1260, set gas limit 1270, and set gas price 1275; and utility functions: copy to clipboard 1230 and show QR code 1265. Each of these features 1215-1275 can be described in further detail in the following Figures.

Figure 13:
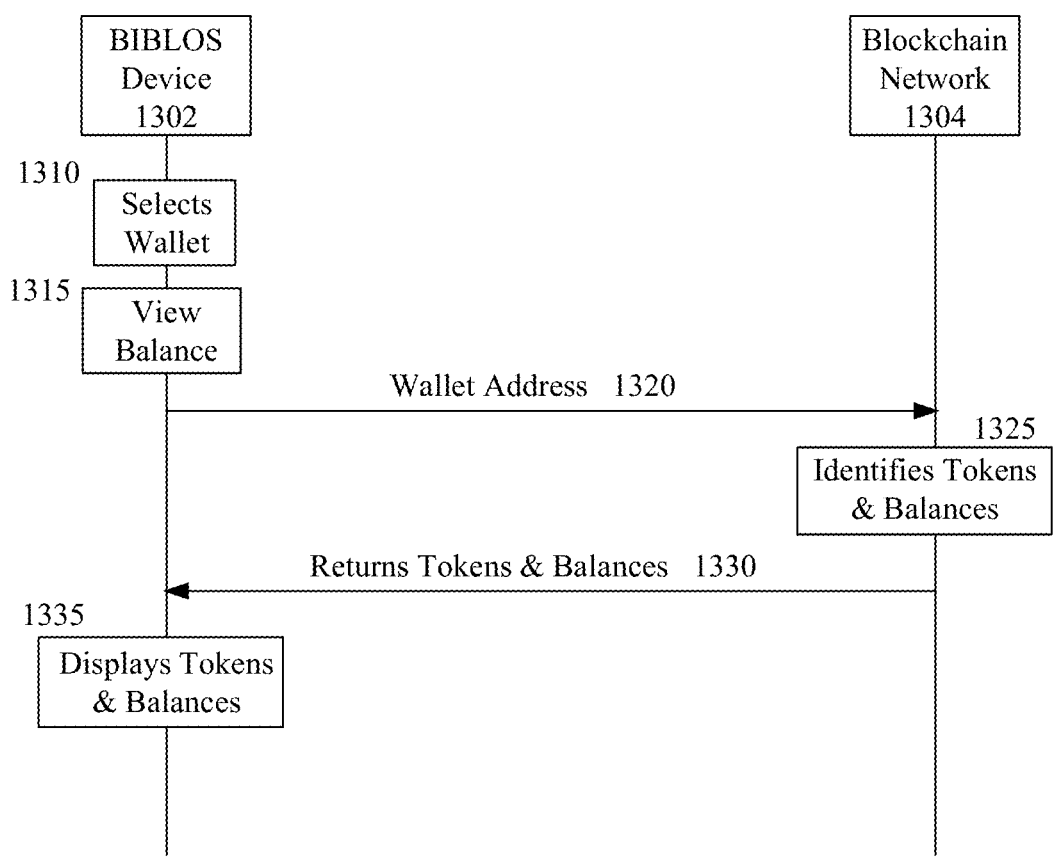
FIG. 13 presents an interaction diagram describing the view balance feature of the cryptocurrency wallet application in accordance with embodiments of the inventive arrangements disclosed herein.

FIG. 13 presents an interaction diagram 1300 describing the view balance feature of the cryptocurrency wallet application in accordance with embodiments of the inventive arrangements disclosed herein. The actions presented in interaction diagram 1300 can be performed within the context of the previous Figures.

To begin, the user can select 1310 the wallet whose balance they wish to view in the cryptocurrency wallet user interface on the BIBLOS device 1302. This step 1310 can be necessary as the user can have multiple, separate cryptocurrency wallets. The user can then select the view balance 1315 feature from the user interface.

The BIBLOS device 1302 can send 1320 the address of the selected cryptocurrency wallet to the blockchain network 1304. The blockchain network 1304 can then identify 1325 the tokens associated with the received wallet address in the blockchain and tally the overall balance of each type of token. The types of tokens and their respective balances can be returned 1330 to the BIBLOS device 1302 where they are displayed 1335 to the user in the user interface.

Figure 14:
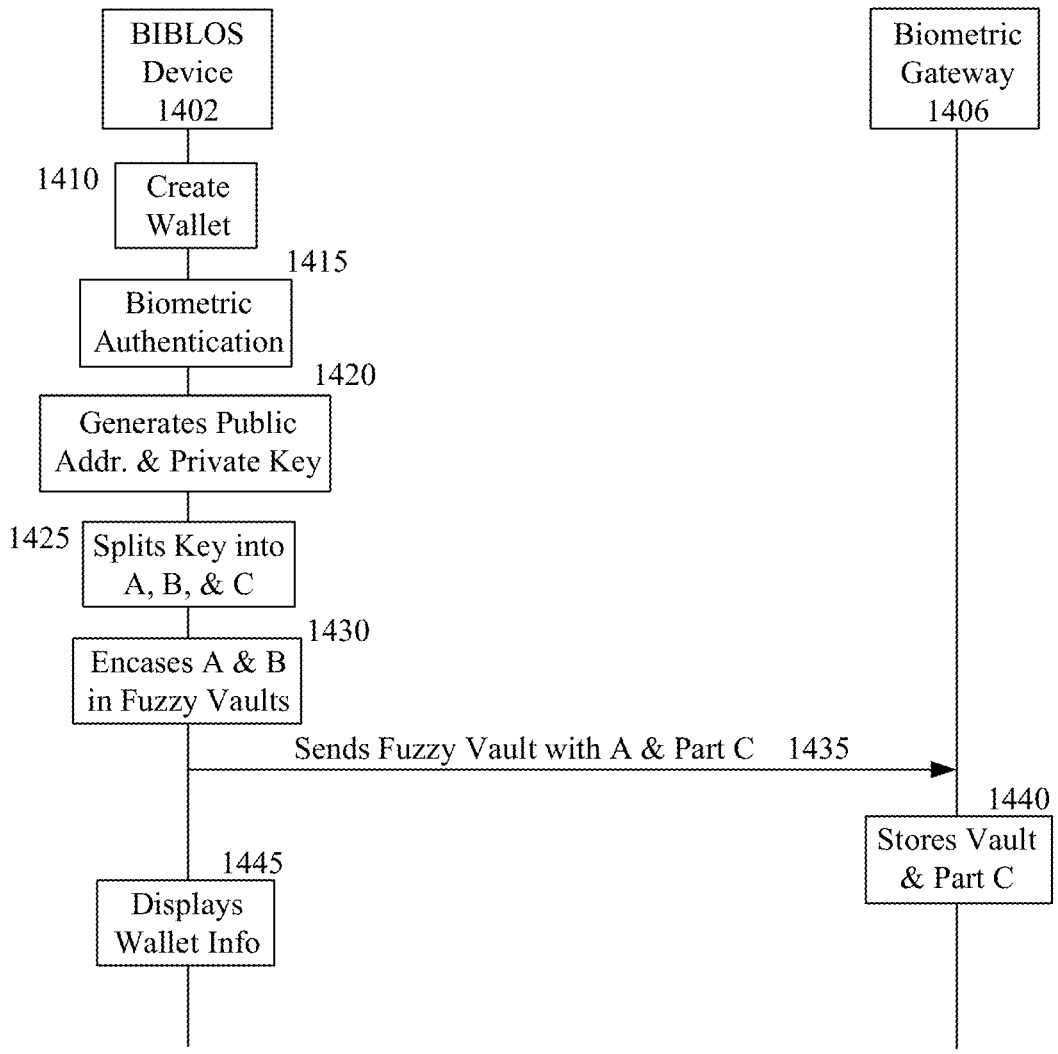
FIG. 14 presents an interaction diagram describing the create wallet feature of the cryptocurrency wallet application in accordance with embodiments of the inventive arrangements disclosed herein.

FIG. 14 presents an interaction diagram 1400 describing the create wallet feature of the cryptocurrency wallet application in accordance with embodiments of the inventive arrangements disclosed herein. The actions presented in interaction diagram 1400 can be performed within the context of the previous Figures.

The user can select the create wallet 1410 feature from the cryptocurrency wallet application user interface on the BIBLOS device 1402. This feature selection can trigger biometric authentication 1415 for the user to ensure that the appropriate user is executing the feature.

The BIBLOS device 1402 can then generate 1420 a public address (i.e., public encryption key) for the new cryptocurrency wallet and a new private encryption key. It can be important to distinguish that the private encryption key generated by this feature is separate from the private encryption key generated for the user upon registration with the biometric authentication gateway. Each cryptocurrency wallet that a user has can be required to have a distinct public/private encryption key pair, as is known in the Art.

In accordance with how the secure computer system architecture handles the security of private encryption keys, the BIBLOS device 1402 can split 1425 the cryptocurrency wallet's private encryption key into three parts—A, B, and C. Parts A and B of the private encryption key can be encased 1430 in separate fuzzy vaults.

The fuzzy vault containing part A and part C can be sent 1435 to the biometric gateway 1406 for storage 1440 there. Then the information about the newly-created cryptocurrency wallet can be displayed 1445 to the user on the BIBLOS device 1402.

Figure 15:
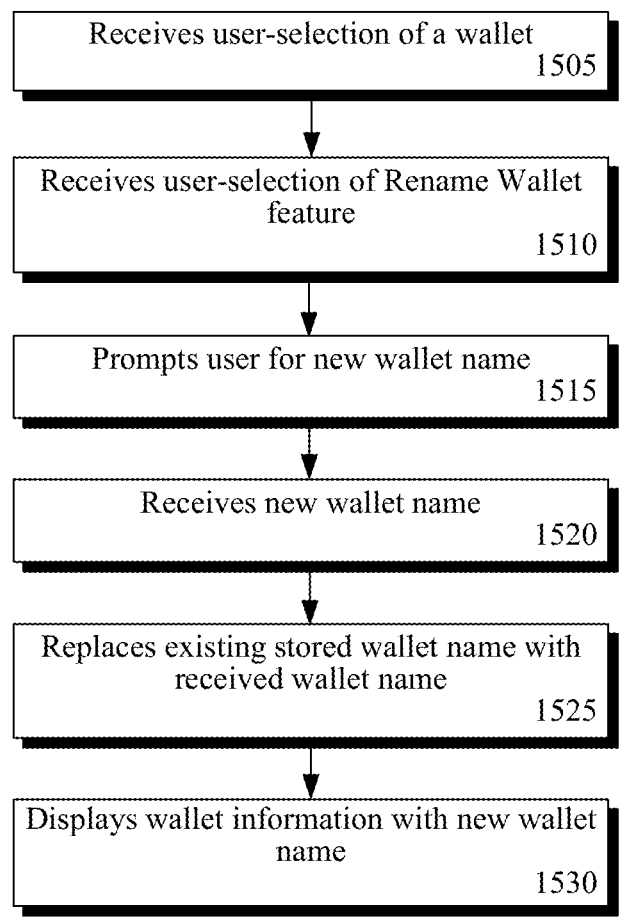
FIG. 15 is a flowchart of a method describing the rename wallet feature of the cryptocurrency wallet application in accordance with embodiments of the inventive arrangements disclosed herein.

FIG. 15 is a flowchart of a method 1500 describing the rename wallet feature of the cryptocurrency wallet application in accordance with embodiments of the inventive arrangements disclosed herein. Method 1500 can be performed within the context of the previous Figures.

Method 1500 can begin with step 1505 where the cryptocurrency wallet application received user-selection of a wallet to be renamed within the user interface. User-selection of the rename wallet feature can be received in step 1510. In step 1515, the user can be prompted for a new wallet name.

The new, user-entered wallet name can be received in step 1520. In step 1525, the existing wallet name can be replaced with the received new wallet name. The wallet information showing the new wallet name can be displayed to the user in step 1530.

Figure 16:
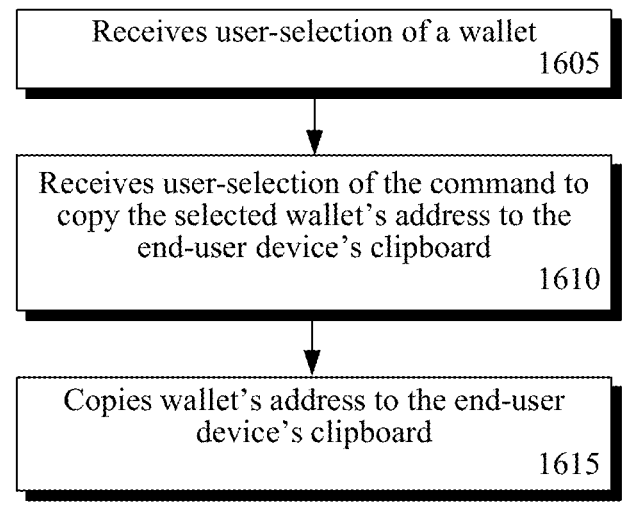
FIG. 16 is a flowchart of a method describing the copy to clipboard feature of the cryptocurrency wallet application in accordance with embodiments of the inventive arrangements disclosed herein.

FIG. 16 is a flowchart of a method 1600 describing the copy to clipboard feature of the cryptocurrency wallet application in accordance with embodiments of the inventive arrangements disclosed herein. Method 1600 can be performed within the context of the previous Figures.

Method 1600 can begin with step 1605 where the cryptocurrency wallet application can receive user-selection of a specific cryptocurrency wallet in the user interface. User-selection of the command (i.e., feature) to copy the selected wallet's public address to the end-user device's clipboard can be received in step 1610. In step 1615, the cryptocurrency wallet application can copy the wallet's public address to the clipboard of the end-user device.

Since the copy to clipboard feature affects only the public address of the user's cryptocurrency wallet, the steps of method 1600 can be performed on an unsecure end-user device as well as a BIBLOS device or secure end-user device.

Figure 17:
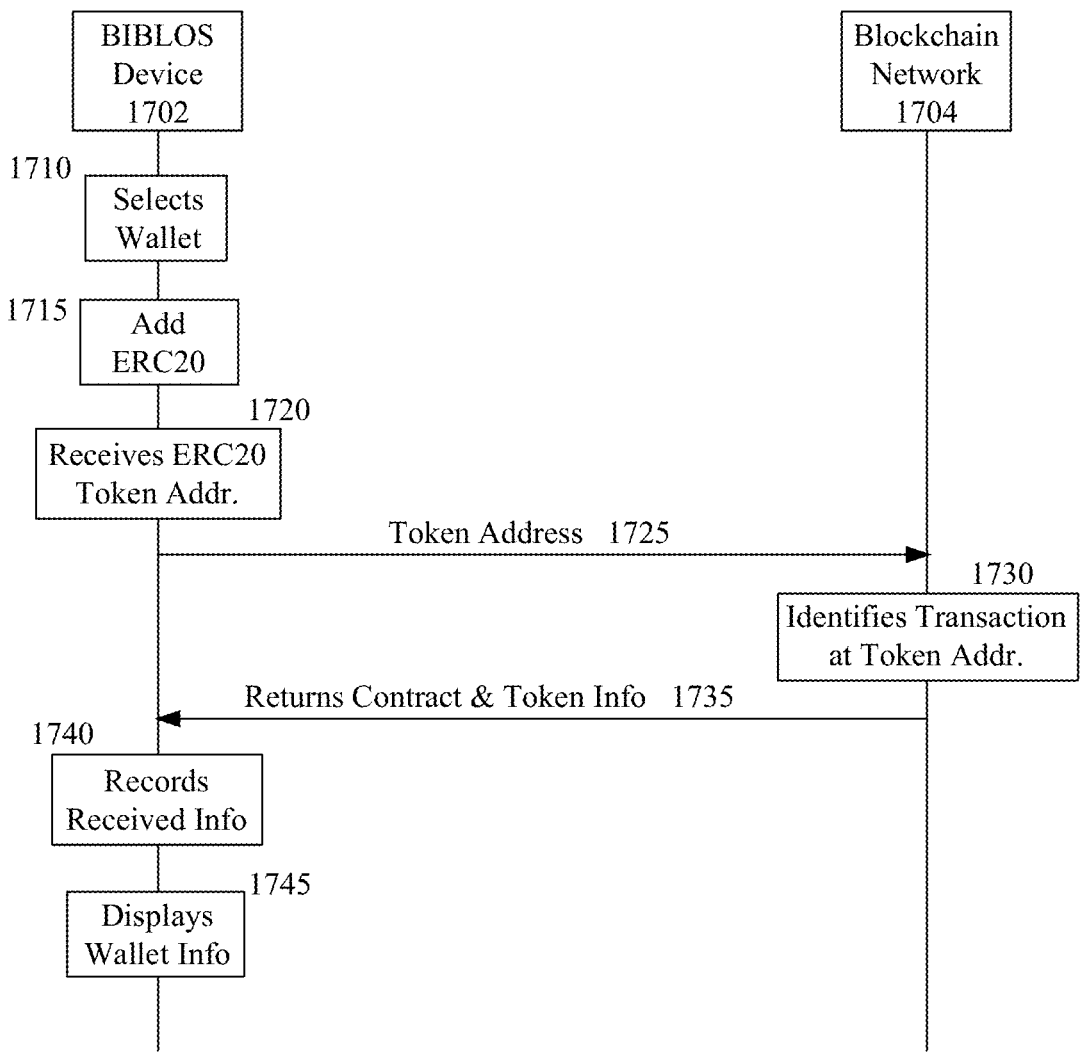
FIG. 17 presents an interaction diagram describing the add ERC20 token feature of the cryptocurrency wallet application in accordance with embodiments of the inventive arrangements disclosed herein.

FIG. 17 presents an interaction diagram 1700 describing the add ERC20 token feature of the cryptocurrency wallet application in accordance with embodiments of the inventive arrangements disclosed herein. The actions presented in interaction diagram 1700 can be performed within the context of the previous Figures.

An ERC20 token can be a cryptocurrency token designed for use with the ETHEREUM blockchain network and follows a predefined list of standards. An ERC20 token can be a non-native token and not the native cryptocurrency (ETHER) of the ETHEREUM platform like the RSN token used in the RISEN. Smart contracts can be used to create ERC20 tokens and handle operations upon them. As is known in the ART, a smart contract can be a self-executing set of code that defines the parameters and enforces the performance of a blockchain transaction.

In the user interface running on their BIBLOS device 1702, the user can select 1710 the cryptocurrency wallet that they wish to add ERC20 tokens. It should be noted that the ERC20 tokens already exist in the blockchain and are not being generated anew. The existing ERC20 tokens can belong to user but are associated with a different cryptocurrency wallet that they own or to a different blockchain user.

The user can then execute 1715 the add ERC20 token feature. The cryptocurrency wallet application can receive 1720 the public blockchain address of the ERC20 tokens from the user. The address of the ERC20 tokens can be manually entered in the user interface or a QR code encoding the address can be scanned.

The BIBLOS device 1702 can send 1725 the received token address to the blockchain network 1704. The blockchain network 1704 can then identify the transaction in the blockchain at the received address. Information about the smart contract defining the ERC20 token as well as the token itself (e.g., name, decimal places, symbol, image, balance, etc.) can be returned 1735 to the BIBLOS device 1702 by the blockchain network 1704. The cryptocurrency wallet application can then record 1740 the received information as appropriate and display 1745 the updated wallet information to the user on the BIBLOS device 1702.

Figure 18:
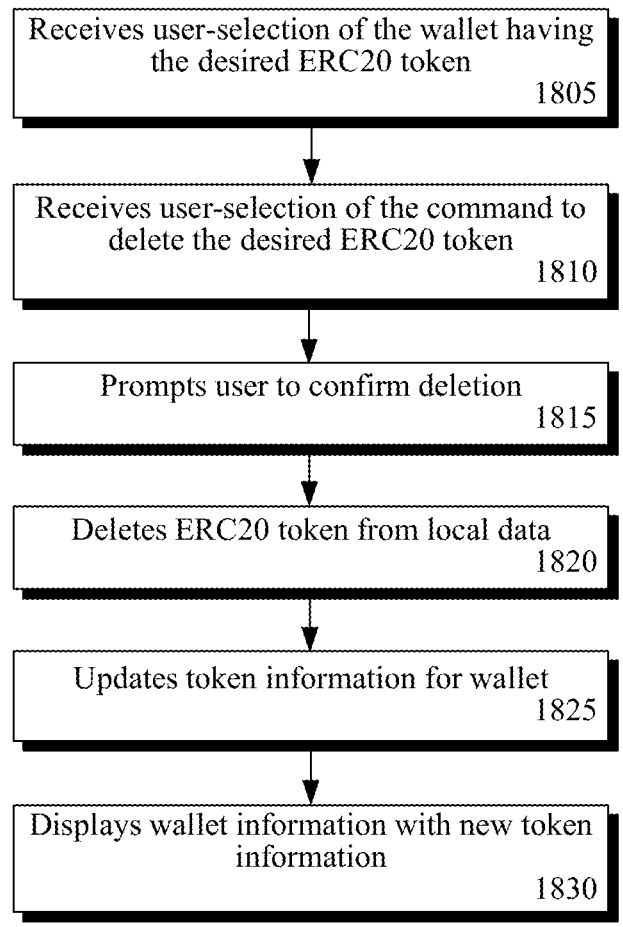
FIG. 18 is a flowchart of a method describing the delete ERC20 token feature of the cryptocurrency wallet application in accordance with embodiments of the inventive arrangements disclosed herein.

FIG. 18 is a flowchart of a method 1800 describing the delete ERC20 token feature of the cryptocurrency wallet application in accordance with embodiments of the inventive arrangements disclosed herein. Method 1800 can be performed within the context of the previous Figures.

Method 1800 can begin with step 1805 where the cryptocurrency wallet application receives the user-selection of the cryptocurrency wallet having the ERC20 token that they wish to delete. Next, user-selection of the command to delete the desired ERC20 token from the selected wallet can be received in step 1810. In step 1815, the user can be prompted to confirm the token deletion.

Upon confirmation, the ERC20 token can be deleted from the local data in step 1820. In step 1825, the token information for the wallet can be update. The wallet information can be displayed to user with the new token information that reflects the deletion in step 1830.

Figure 19:
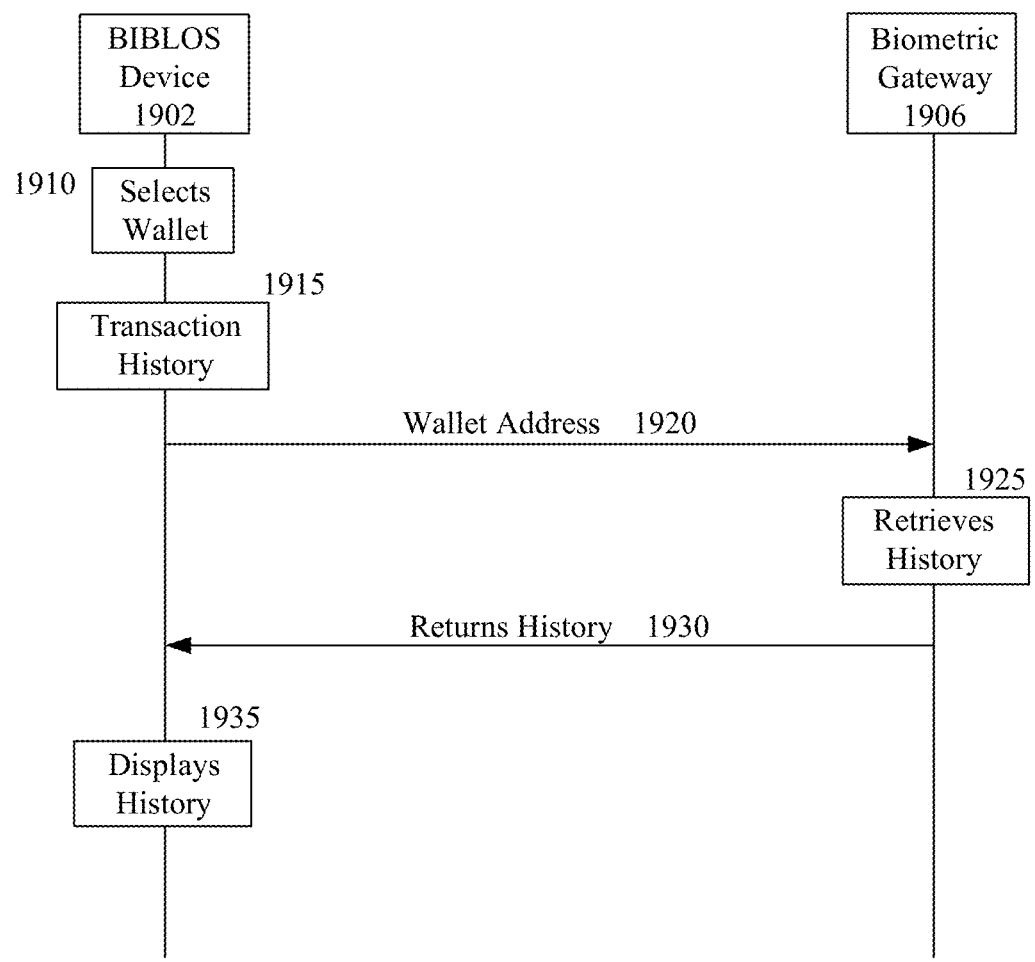
FIG. 19 presents an interaction diagram describing the get transaction history feature of the cryptocurrency wallet application in accordance with embodiments of the inventive arrangements disclosed herein.

FIG. 19 presents an interaction diagram 1900 describing the get transaction history feature of the cryptocurrency wallet application in accordance with embodiments of the inventive arrangements disclosed herein. The actions presented in interaction diagram 1900 can be performed within the context of the previous Figures.

In the user interface running on their BIBLOS device 1902, the user can select 1910 the cryptocurrency wallet that they wish view their transaction history. The user can then execute 1915 the transaction history feature. The BIBLOS device 1902 can send 1920 the biometric gateway 1906 the public address of the selected cryptocurrency wallet and a request for its history.

The biometric gateway 1906 can then retrieve 1925 the transactions corresponding to the received address that is stored in its database. The retrieved transaction history can be returned 1930 to the BIBLOS device 1902 by the biometric gateway 1906. The cryptocurrency wallet application can then display 1935 the received transaction history data to the user on the BIBLOS device 1902.

Figure 20:
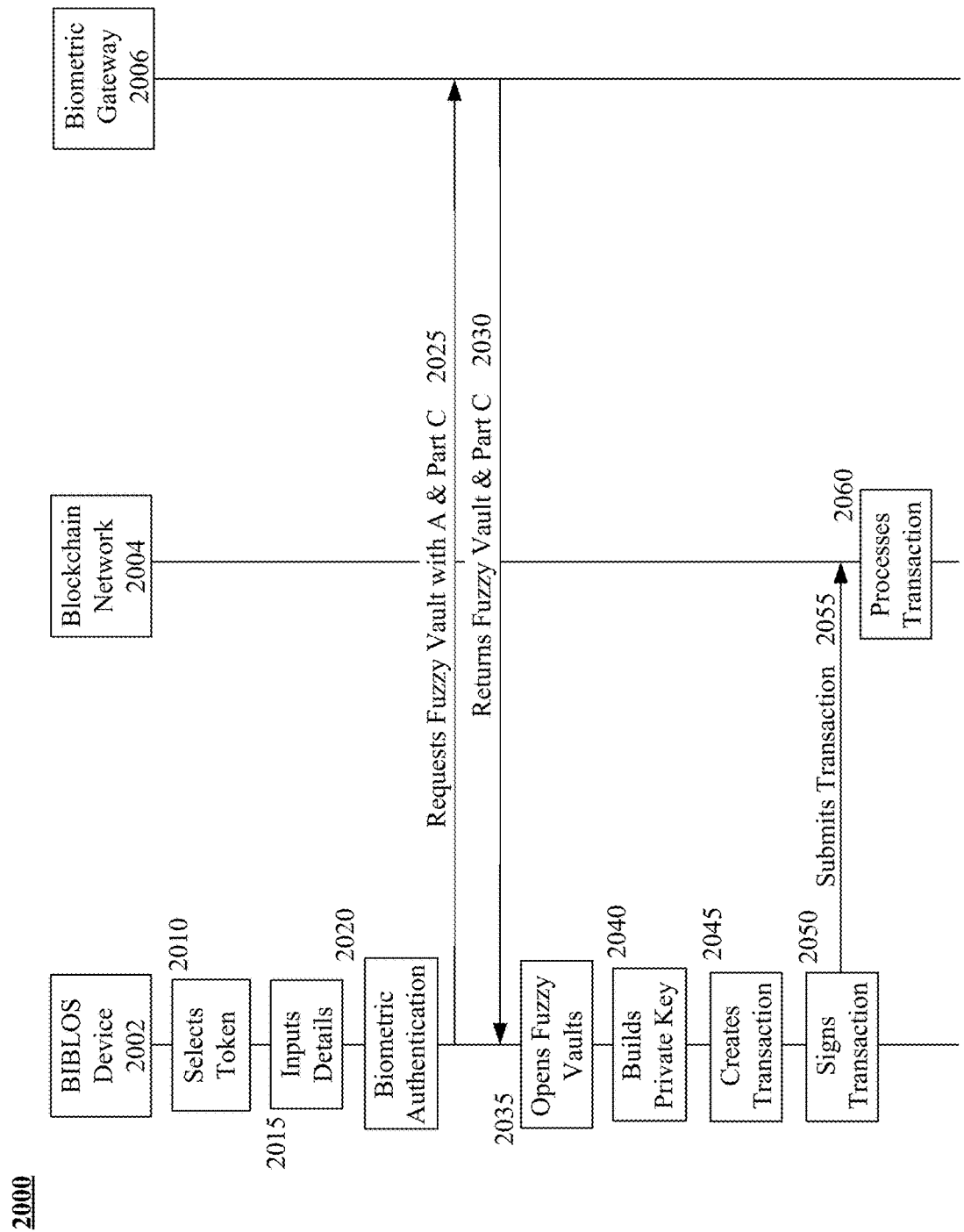
FIG. 20 presents an interaction diagram describing the transfer ERC20 tokens feature of the cryptocurrency wallet application in accordance with embodiments of the inventive arrangements disclosed herein.

FIG. 20 presents an interaction diagram 2000 describing the transfer ERC20 tokens feature of the cryptocurrency wallet application in accordance with embodiments of the inventive arrangements disclosed herein. The actions presented in interaction diagram 2000 can be performed within the context of the previous Figures.

In the user interface running on their BIBLOS device 2002, the user can select 2010 the ERC20 token in a cryptocurrency wallet that they wish to transfer. The user can then input 2015 the required details (e.g., recipient address, amount, etc.) for the transfer. At this point, the user can be prompted to perform biometric authentication 2020 to ensure that the registered user is originating the transfer.

Upon successful biometric authentication, the cryptocurrency wallet can request 2025 the fuzzy vault containing part A and the unencrypted part C of the user's private encryption key from the biometric gateway 2006; the fuzzy vault containing part B can be locally available. The biometric gateway 2006 can return 2030 the fuzzy vault and part C to the BIBLOS device 2002.

The fuzzy vaults housing parts A and B can be opened 2035 using the user's biometric vector generated during biometric authentication. Now that all three parts are decrypted, the BIBLOS device 2002 can build 2040 the user's private encryption key. The transfer transaction can be created 2045 using the user-inputted details. Then the transaction can be signed 2050 with the user's private encryption key. After signing the transaction, the BIBLOS device 2002 can immediately purge the user's private encryption key from memory to minimize the risk of it being stolen.

The signed transaction can be submitted 2055 to the blockchain network 2004. The blockchain network 2004 can then process 2060 (i.e., validate and commit to a block of the blockchain) the transaction according to its ruleset.

It should be noted that in the case of unsecure end-user device, the end-user device can send the biometric gateway 2006 the fuzzy vault containing part B. Then the biometric gateway 2006 can open the fuzzy vaults 2035, build 2040 the private encryption key, sign 2045 and submit 2055 the transaction. The parts of the private encryption key can be kept away from the unsecure end-user device.

Figure 21:
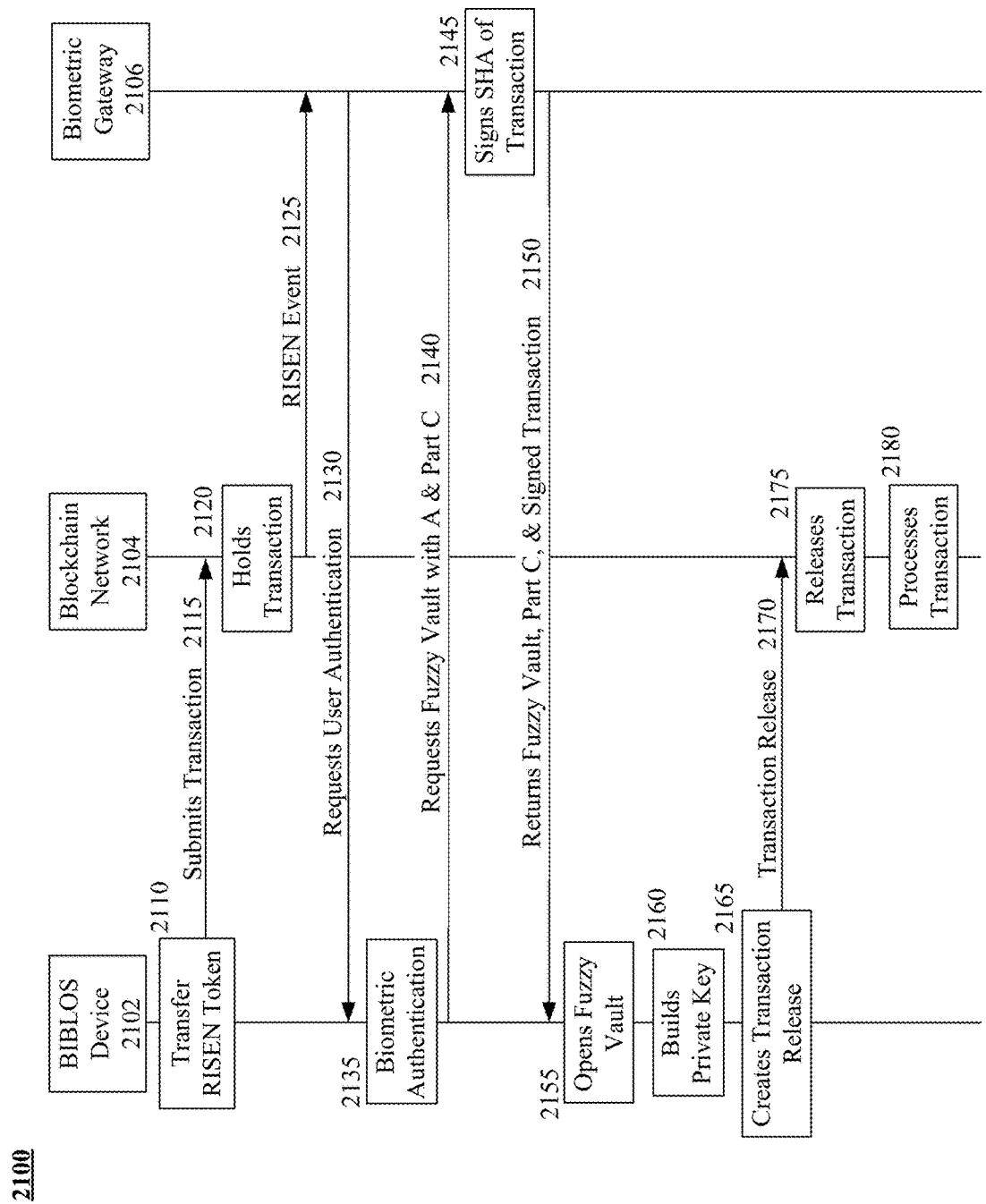
FIG. 21 presents an interaction diagram describing the transfer RISEN token feature of the cryptocurrency wallet application in accordance with embodiments of the inventive arrangements disclosed herein.

FIG. 21 presents an interaction diagram 2100 describing the transfer RISEN token feature of the cryptocurrency wallet application in accordance with embodiments of the inventive arrangements disclosed herein. The actions presented in interaction diagram 2100 can be performed within the context of the previous Figures.

A RISEN token can be a non-native token used in the RISEN. A RISEN token can be handled with additional security, requiring additional biometric authentication by the user prior to transfer, as shown in interaction diagram 2100.

In the user interface running on their BIBLOS device 2102, the user can select 2110 the transfer RISEN token feature and go through the basic steps to create the blockchain transaction. The transaction to transfer the RISEN token can be submitted 2115 to the blockchain network 2104. Instead of processing the received transaction, the blockchain network 2104 can hold 2120 the transaction and trigger a RISEN event 2125.

A listener component of the biometric gateway 2106 can "hear" the RISEN event, causing the biometric gateway 2106 to send 2130 the user's BIBLOS device 2102 a request for user biometric authentication. The user can perform their biometric authentication 2135 via the BIBLOS device 2102.

Upon successful biometric authentication, the BIBLOS device 2102 can request 2140 the fuzzy vault containing part A and part C from the biometric gateway 2106. The biometric gateway 2106 can sign 2145 a hash (SHA) of the transaction as a means of showing its authorization. The biometric gateway 2106 can then return 2150 the fuzzy vault and part C along with the signed transaction to the BIBLOS device 2102.

The fuzzy vaults housing parts A and B can be opened 2155 using the user's biometric vector generated during biometric authentication. Now that all three parts are decrypted, the BIBLOS device 2102 can build 2160 the user's private encryption key. A transaction release can be created 2165 using the details and/or signed transaction and signed with the user's private encryption key. After signing the transaction, the BIBLOS device 2102 can immediately purge the user's private encryption key from memory to minimize the risk of it being stolen.

The transaction release can then be submitted 2170 to the blockchain network 2104. The blockchain network 2104 can release 2175 the held transaction, which is then processed 2180 (i.e., validate and commit to a block of the blockchain).

It should be noted that in the case of unsecure end-user device, the end-user device can send the biometric gateway 2106 the fuzzy vault containing part B. Then the biometric gateway 2106 can open the fuzzy vaults 2155, build 2160 the private encryption key, sign and submit 2165 the transaction release. The parts of the private encryption key can be kept away from the unsecure end-user device.

By requiring biometric authentication prior to transferring the RISEN token, the secure computer system architecture can combat a shortcoming in the blockchain network's 2104 process for handling transactions. The issue can be that the blockchain network 2104 blindly accepts use of a private encryption key as proof that the owner of the token/cryptocurrency originated the transaction. Thus, a private encryption key can be all that is required for a malicious entity to access another's tokens/cryptocurrency.

This additional biometric authentication step prior to processing the transaction can ensure that the token owner is, in fact, originating the transaction as well as inform them of an unauthorized transfer (allowing the owner to terminate the transaction without losing their tokens). While this additional step will incur additional time and processing resources, it can be felt that these additional resources are well spent for the increased level of security that they provide.

Figure 22:
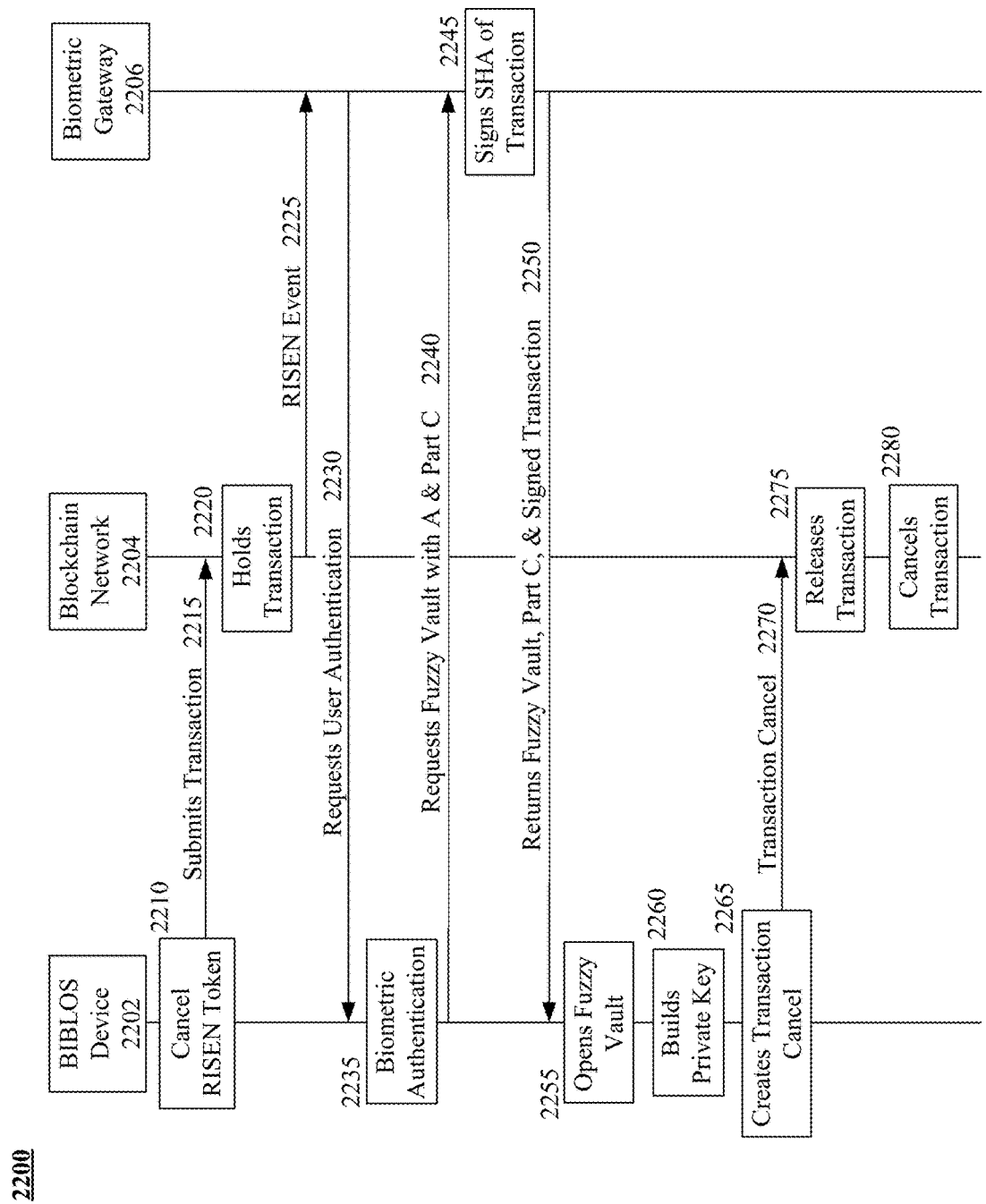
FIG. 22 presents an interaction diagram describing the cancel RISEN token transaction feature of the cryptocurrency wallet application in accordance with embodiments of the inventive arrangements disclosed herein.

FIG. 22 presents an interaction diagram 2200 describing the cancel RISEN token transaction feature of the secure wallet application in accordance with embodiments of the inventive arrangements disclosed herein. The actions presented in interaction diagram 2200 can be performed within the context of the previous Figures.

A RISEN token can be a non-native token used in the RISEN. A RISEN token can be handled with additional security, requiring additional biometric authentication by the user prior to cancelling a transaction where it is used, as shown in interaction diagram 2200.

In the user interface running on their BIBLOS device 2202, the user can select 2210 the cancel RISEN token transaction feature and go through the basic steps to create the blockchain transaction. The transaction to cancel the RISEN token transaction can be submitted 2215 to the blockchain network 2204. Instead of processing the received transaction, the blockchain network 2204 can hold 2220 the transaction and trigger a RISEN event 2225.

A listener component of the biometric gateway 2206 can "hear" the RISEN event, causing the biometric gateway 2206 to send 2230 the user's BIBLOS device 2202 a request for user biometric authentication. The user can perform their biometric authentication 2235 via the BIBLOS device 2202.

Upon successful biometric authentication, the BIBLOS device 2202 can request 2240 the fuzzy vault containing part A and part C from the biometric gateway 2206. The biometric gateway 2206 can sign 2245 a hash (SHA) of the transaction as a means of showing its authorization. The biometric gateway 2206 can then return 2250 the fuzzy vault and part C along with the signed transaction to the BIBLOS device 2202.

The fuzzy vaults housing parts A and B can be opened 2255 using the user's biometric vector generated during biometric authentication. Now that all three parts are decrypted, the BIBLOS device 2202 can build 2260 the user's private encryption key. A transaction cancel can be created 2265 using the details and/or signed transaction and signed with the user's private encryption key. After signing the transaction, the BIBLOS device 2202 can immediately purge the user's private encryption key from memory to minimize the risk of it being stolen.

The transaction cancel can then be submitted 2270 to the blockchain network 2204. The blockchain network 2204 can release 2275 the held transaction, which is then cancelled 2280).

It should be noted that in the case of unsecure end-user device, the end-user device can send the biometric gateway 2206 the fuzzy vault containing part B. Then the biometric gateway 2206 can open the fuzzy vaults 2255, build 2260 the private encryption key, sign and submit 2265 the transaction release. The parts of the private encryption key can be kept away from the unsecure end-user device.

Again, the additional resources required for the extra biometric authentication can be considered well spent for the increased level of security.

Figure 23:
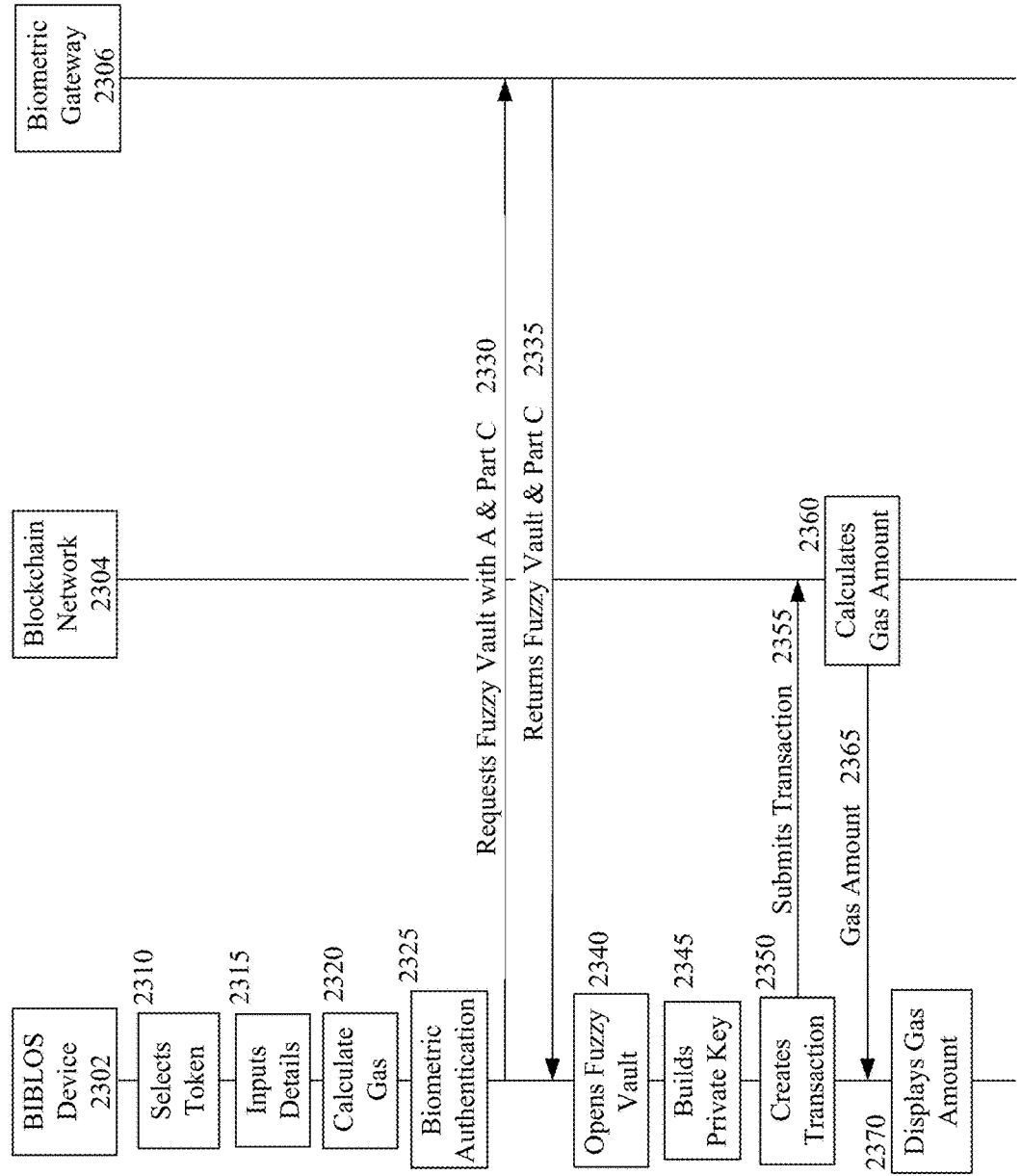
FIG. 23 presents an interaction diagram describing the calculate gas feature of the cryptocurrency wallet application in accordance with embodiments of the inventive arrangements disclosed herein.

FIG. 23 presents an interaction diagram 2300 describing the calculate gas feature of the cryptocurrency wallet application in accordance with embodiments of the inventive arrangements disclosed herein. The actions presented in interaction diagram 2300 can be performed within the context of the previous Figures. For example purposes, gasoline can be used as the subject of the cryptocurrency wallet application features for non-native applications.

In the user interface running on their BIBLOS device 2302, the user can select 2310 the token in a cryptocurrency wallet that they wish to transfer. The user can then input 2315 the required details (e.g., recipient address, amount, etc.) for the transfer. The user can then select 2320 the calculate gas feature, which is meant to inform the user as to how much gas the transaction will cost.

At this point, the user can be prompted to perform biometric authentication 2325 to ensure that the registered user is originating the transfer. Upon successful biometric authentication, the cryptocurrency wallet can request 2330 the fuzzy vault containing part A and the unencrypted part C of the user's private encryption key from the biometric gateway 2306; the fuzzy vault containing part B can be locally available. The biometric gateway 2306 can return 2335 the fuzzy vault and part C to the BIBLOS device 2302.

The fuzzy vaults housing parts A and B can be opened 2340 using the user's biometric vector generated during biometric authentication. Now that all three parts are decrypted, the BIBLOS device 2302 can build 2345 the user's private encryption key. The transaction request the gas calculation can be created 2350 using the user-inputted details. As with all other transactions, this transaction can also be signed with the user's private encryption key and the user's private encryption key immediately purges from the BIBLOS device's 2302 memory.

The signed transaction can be submitted 2355 to the blockchain network 2304. The blockchain network 2304 can then calculate 2360 the amount of gas for the transaction according to its predefined ruleset. The blockchain network 2304 can return 2365 the calculated gas amount to the BIBLOS device 2302 where it can be displayed 2370 to the user.

It should be noted that in the case of unsecure end-user device, the end-user device can send the biometric gateway 2306 the fuzzy vault containing part B. Then the biometric gateway 2306 can open the fuzzy vaults 2340, build 2345 the private encryption key, sign and submit 2350 the transaction. The parts of the private encryption key can be kept away from the unsecure end-user device.

Figure 24:
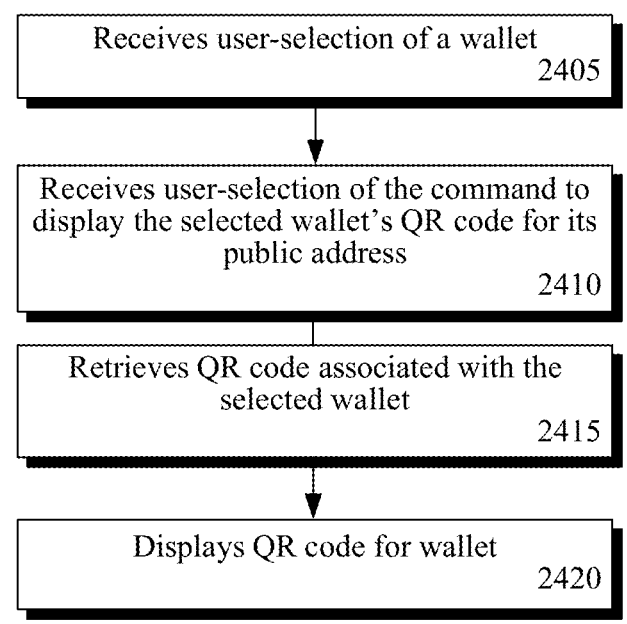
FIG. 24 is a flowchart of a method describing the show public address QR code feature of the cryptocurrency wallet application in accordance with embodiments of the inventive arrangements disclosed herein.

FIG. 24 is a flowchart of a method 2400 describing the show public address QR code feature of the cryptocurrency wallet application in accordance with embodiments of the inventive arrangements disclosed herein. Method 2400 can be performed within the context of the previous Figures.

Method 2400 can begin with step 2405 where the cryptocurrency wallet application receives user-selection of a cryptocurrency wallet. User-selection of the command to display the selected wallet's QR code for its public address can be received in step 2410.

In step 2415, the QR code associated with the selected wallet can be retrieved. The QR code can be generated when the wallet is created and store as part of the wallet's data or the QR code can be automatically generated as part of step 2415. The QR code for the wallet can then be displayed in step 2420.

Figure 25:
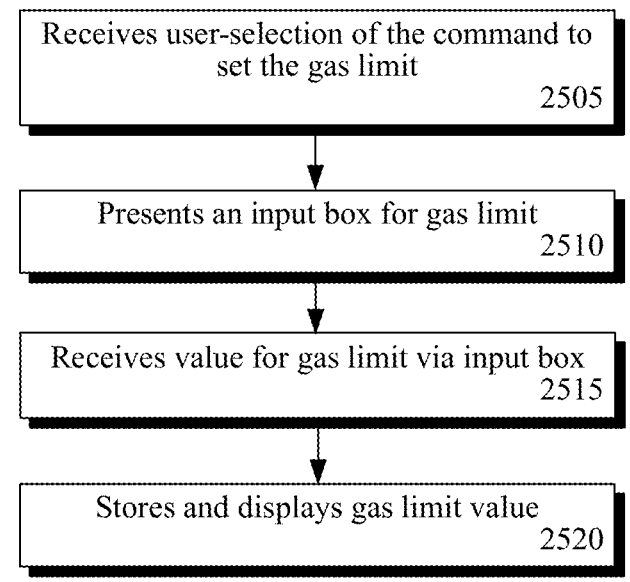
FIG. 25 is a flowchart of a method describing the set gas limit feature of the cryptocurrency wallet application in accordance with embodiments of the inventive arrangements disclosed herein.

FIG. 25 is a flowchart of a method 2500 describing the set gas limit feature of the cryptocurrency wallet application in accordance with embodiments of the inventive arrangements disclosed herein. Method 2500 can be performed within the context of the previous Figures.

Method 2500 can begin with step 2505 where the cryptocurrency wallet receives user-selection of the command to set the gas limit. An input box for the gas limit can then be presented within the user interface in step 2510. In step 2515, a value for the gas limit can be received via the input box. The received gas limit value can be stored and displayed in step 2520.

Figure 26:
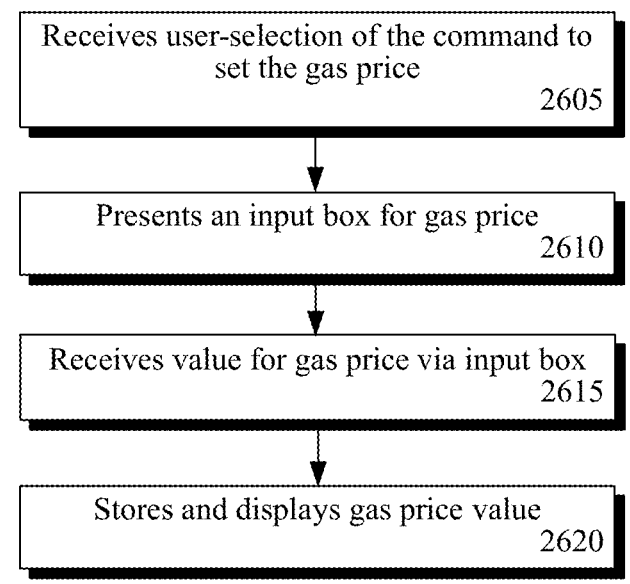
FIG. 26 is a flowchart of a method describing the set gas price feature of the cryptocurrency wallet application in accordance with embodiments of the inventive arrangements disclosed herein.

FIG. 26 is a flowchart of a method 2600 describing the set gas price feature of the cryptocurrency wallet application in accordance with embodiments of the inventive arrangements disclosed herein. Method 2600 can be performed within the context of the previous Figures.

Method 2600 can begin with step 2605 where the cryptocurrency wallet application can receive user-selection of the command to set the gas price. An input box for the gas price can then be presented within the user interface in step 2610. In step 2615, a value for the gas price can be received via the input box. The received gas price value can be stored and displayed in step 2620.

The diagrams in the Figures illustrate the architecture, functionality, and operation of possible implementations of systems and methods according to various embodiments of the present invention. It will also be noted that each block of the block diagrams and combinations of blocks in the block diagrams can be implemented by special purpose hardware-based systems that perform the specified functions or acts, or combinations of special purpose hardware and computer instructions.

What is claimed is:

1. A secure computer system architecture comprising:
    a plurality of network-enabled end-user devices;
    a plurality of services available to the end-user devices, wherein each service is provided via at least one of an appropriately-configured server meeting a predefined minimum level of computer and network security and a blockchain network; and
    a biometric authentication gateway that controls access to the plurality of services by the plurality of end-user devices based upon validation of a biometric vector of a user of an end-user device, wherein enrollment with the biometric authentication gateway by each end-user device and their respective user is required, said enrollment establishing an enrollment biometric vector of the user and a relationship with an identifier of the respective end-user device, wherein network communications between the plurality of end-user devices, servers or the computing system providing the services, and the biometric authentication gateway are secured using an improved public key infrastructure (PKI) approach that segments a private encryption key generated for the user into three parts and distributes the three parts between the respective end-user device and the biometric authentication gateway, wherein two of the three parts are encased within fuzzy vaults based upon the user's respective biometric vector, wherein retrieving the two parts of the user's respective private encryption key from the fuzzy vaults for reassembly is not performed without successful biometric authentication of the user to their respective enrollment biometric vector, ensuring that only the user is able to execute the plurality of services.

2. The system architecture of claim 1, wherein an end-user device utilizes a secure real-time operating system (RTOS) that further increases security for the locally-stored fuzzy vault having a respective part of the user's private encryption key therein.

3. The system architecture of claim 1, wherein biometric data used for the biometric vector comprises at least one of a near-infrared (NIR) iris scan, an image of the user's face for facial recognition, a fingerprint/handprint, a DNA profile, and a voice sample for voice recognition.

4. The system architecture of claim 1, wherein at least a subset of the plurality of services embed a biometric vector or the user's enrollment biometric vector within at least one of a network communication, a blockchain transaction, and a data file that is conveyed between corresponding software applications running on end-user devices, wherein access to this conveyance requires biometric authentication to access.

5. The system architecture of claim 1, wherein the corresponding software application automatically generates a cryptocurrency wallet commensurate with the blockchain network.

6. The system architecture of claim 1, wherein at least one service requires ownership of non-native tokens as governed by a non-native application configured to manage generation and assignation of said non-native tokens, wherein said non-native application is accessible by a corresponding software application running on the end-user devices.

7. The system architecture of claim 1, wherein the biometric authentication gateway utilizes Biometric Open Protocol Standard (BOPS) as maintained by Institute of Electrical and Electronics Engineers (IEEE).

8. The system architecture of claim 1, wherein the blockchain network is a decentralized, open-source blockchain network.

9. A method for securing a private encryption key comprising:
    enrolling users of a computer system, which is configured in accordance with a secure system architecture that utilizes a biometrics authentication gateway to control access to at least one of components and services of the computer system, with the biometric authentication gateway to establish a respective enrollment biometric vector and an identity of a respective end-user device;
    segmenting a generated encryption key into three parts of predefined lengths;
    encrypting a first part and a second part of the segmented encryption key using a predetermined cryptography technique that incorporates unique elements from the respective user's enrollment biometric vector, wherein subsequent access to the first and second parts requires successful biometric authentication by the respective user; and
    storing the three parts of the encryption key between the biometric authentication gateway and the end-user device, wherein the encryption key remains uncompromised when one or two of the three parts becomes compromised, wherein the storing further comprises:
        storing a first vault in a data store associated with the biometric authentication gateway, wherein the first vault comprises a third part of the encryption key and is encrypted in the first vault using the enrollment biometric vector;
        storing a second vault local to the end-user device, wherein the second vault comprises the second part of the encryption key and is encrypted in the second vault using the enrollment biometric vector.

10. The method of claim 9, wherein encrypting the first and second parts further comprises:
    accessing the respective user's enrollment biometric vector, wherein said biometric vector conforms to a fuzzy vault framework;
    creating a first fuzzy vault, also referenced as the first vault, using a predetermined fuzzy vault algorithm, the first part, and the enrollment biometric vector; and
    creating a second fuzzy vault, also referenced as the second vault, using the predetermined fuzzy vault algorithm, the second part, and the enrollment biometric vector.

11. The method of claim 10, wherein storing the three parts further comprises:
    storing the second fuzzy vault local to the end-user device; and
    storing the first fuzzy vault and a third part of the encryption key in a data store associated with the biometric authentication gateway.

12. The method of claim 11, further comprising:
    storing a copy of the second fuzzy vault in a blockchain maintained by a blockchain network as part of a restore service of the computer system, wherein said blockchain network supports non-native applications, digital contracts, and non-native tokens.

13. The method of claim 9, wherein, when the end-user device runs a secure real-time operating system (RTOS), the generating, segmenting, and encrypting steps are performed by the end-user device.

14. The method of claim 9, wherein, when the end-user device lacks a secure real-time operating system (RTOS), the generating, segmenting, and encrypting steps are performed by the biometric authentication gateway.

15. The method of claim 9, further comprising:
    when a task of the computer system requires use of the encryption key, obtaining the three parts of the encryption key from the biometric authentication gateway and end-user device;
    decrypting the first and second parts of the encryption key; and
    reassembling the encryption key from the three parts.

16. A computer system security method comprising:
    enrolling a user, wherein said enrollment produces an enrollment biometric vector for the user and a unique device ID for the end-user device, wherein a biometric vector is a unique subset of data points extracted from at least one item of the user's biometric data as captured by the end-user device, and, wherein the biometric vector is encrypted using a predetermined cryptography technique that utilizes said biometric vector and stored local to the end-user device;

in response to a request to access a service provided by a secure computer system or to execute a task that requires use of the user's secured private encryption key, authenticating a newly-captured biometric vector for the user against their respective enrollment biometric vector, wherein failure to perform said biometric authentication results in an automatic denial of the request;

upon successful biometric authentication handling the request; and upon unsuccessful biometric authentication denying the request, wherein biometric authentication further comprises:

capturing the at least one item of the user's biometric data in real-time;

processing the captured at least one item of biometric data for consumption;

generating the biometric vector from the at least one item of captured biometric data;

attempting to decrypt the enrollment biometric vector using the generated biometric vector:

upon successful decryption of the enrollment biometric vector, comparing the new biometric vector to the enrollment biometric vector to produce a similarity score that quantitatively represents an equivalence between the newly-captured biometric vector and the enrollment biometric vector;

when the similarity score meets a predefined threshold value, indicating that the biometric authentication is successful;

when the similarity score fails to meet a predefined threshold value, indicating that the biometric authentication is unsuccessful;

encrypting the enrollment biometric vector using a predetermined cryptography technique and the new biometric vector; and purging the generated biometric vector from local memory to guard against its unauthorized access.

17. The security method of claim 16, wherein enrollment further comprises:

performing the capturing, processing, and generating two additional and separate times to produce a set of three biometric vectors; and calculating a mean biometric vector for the set of three biometric vectors, wherein said mean biometric vector is used as the user's enrollment biometric vector.

18. The security method of claim 16, further comprises:

securing a public key infrastructure (PKI) private encryption key belonging to the user by segmenting the private encryption key into three parts and distributing the three parts between the end-user device and at least one component of the secure computer system, wherein at least two of the three parts are encrypted using the predetermined cryptography technique that utilizes the user's enrollment biometric vector, wherein the private encryption key remains uncompromised if one or two of the three parts becomes compromised.

19. The security method of claim 18, wherein, when the request is to execute the task that requires use of the user's secured private encryption key and biometric authentication is successful, said method further comprises:

obtaining the three parts of the private encryption key from the end-user device and the at least one component of the secure computer system;

decrypting the at least two of the three parts of the private encryption key that are encrypted; and reassembling the private encryption key from the three parts.

20. The security method of claim 16, wherein the predetermined cryptography technique is a fuzzy vault, wherein all biometric vectors, including the enrollment biometric vector, conform to a predetermined format usable with the fuzzy vault.

\* \* \* \* \*